(12) United States Patent
Feddrix et al.

(10) Patent No.: US 7,501,208 B2
(45) Date of Patent: *Mar. 10, 2009

(54) DOPED MANGANESE DIOXIDES

(75) Inventors: Frank H. Feddrix, Westlake, OH (US); Scott W. Donne, Garden Suburb (AU); Martin Devenney, Mountain View, CA (US); Alexander Gorer, San Jose, CA (US)

(73) Assignee: Eveready Battery Company, Inc., St. Louis, MO (US)

(*) Notice: Subject to any disclaimer, the term of this patent is extended or adjusted under 35 U.S.C. 154(b) by 334 days.

This patent is subject to a terminal disclaimer.

(21) Appl. No.: 10/296,899

(22) PCT Filed: Jun. 1, 2001

(86) PCT No.: PCT/US01/17737

§ 371 (c)(1),
(2), (4) Date: May 22, 2003

(87) PCT Pub. No.: WO01/93348

PCT Pub. Date: Dec. 6, 2001

(65) Prior Publication Data

US 2003/0215712 A1    Nov. 20, 2003

(51) Int. Cl.
*H01M 4/50*    (2006.01)
(52) U.S. Cl. .................. 429/224; 429/220; 429/221; 429/223; 429/229; 429/231.5; 429/232; 429/206; 423/599; 252/182.1
(58) Field of Classification Search ............ 429/224, 429/232, 129, 233, 220, 221, 223, 229, 231.5, 429/206; 423/599; 252/182.1
See application file for complete search history.

(56) References Cited

U.S. PATENT DOCUMENTS

| 5,596,278 | A | * | 1/1997 | Lin .............................. 429/91 |
| 5,691,005 | A | * | 11/1997 | Morigaki et al. ........... 29/623.5 |
| 5,952,124 | A | | 9/1999 | Kainthla et al. |
| 6,143,446 | A | | 11/2000 | Davis et al. .................. 429/224 |
| 6,440,181 | B1 | | 8/2002 | Bowden et al. |
| 6,780,393 | B2 | | 8/2004 | Murayama et al. |
| 6,916,580 | B2 | | 7/2005 | Cho et al. |
| 2003/0215712 | A1 | | 11/2003 | Feddrix et al. |

FOREIGN PATENT DOCUMENTS

| EP | 1108681 | | 6/2001 |
| FR | 2718728 | * | 10/1995 |
| JP | 48-051222 | | 7/1973 |
| JP | 6-1698 | | 1/1994 |
| WO | WO 98/22387 | | 5/1998 |
| WO | WO 99/00861 | | 1/1999 |

OTHER PUBLICATIONS

Kishi et al. "The oxygen evolution reaction of cobalt-containing B-manganese dioxide. Surface and Coatings Technology", (1998), 34 (3), pp. 287-293.*
Jantscher, Wolfgang, et al. Synthesis, Characterization and Application of Doped Electrolytic Manganese Dioxides, *Journal of Power Sources 79*, No. 1, May 1999, p. 9-18.
Binder, L., et al. Experiments on the Electrochemical Preparation of Modified Manganese Dioxide and on Continuous Electrolysis, Inst. For Chem. Tech. of Inorganic Substances, vol. 125—VCH Verlagsgesellschaft, 1992.
Tamura, Hiroki, et al. Incorporation of Impurity Metal Ions in Electrolytic Manganese Dioxide, *Journal of the Electrochemical Society*, vol. 141, No. 8, Aug. 1994.
Qixin et al. "The Formation and Electrochemical Activity of Fibrous Electrolytic Manganese Dioxide" Fall Meeting—Electrochemical Society, New Orleans LA USA, vol. 84-2, 1984, pp. 126-127, XP-002188790.
European Search Report.

* cited by examiner

*Primary Examiner*—Laura S Weiner
(74) *Attorney, Agent, or Firm*—Russell H. Toye, Jr.

(57) ABSTRACT

An active manganese dioxide electrode material that exhibits improved electrochemical performances compared with conventional manganese dioxide materials includes at least one dopant. The doped manganese dioxide electrode materials may be produced by a wet chemical method (CMD) or may be prepared electrolytically (EMD) using a solution containing manganese sulfate, sulfuric acid, and a dopant, wherein the dopant is present in an amount of at least about 25 ppm.

4 Claims, 7 Drawing Sheets

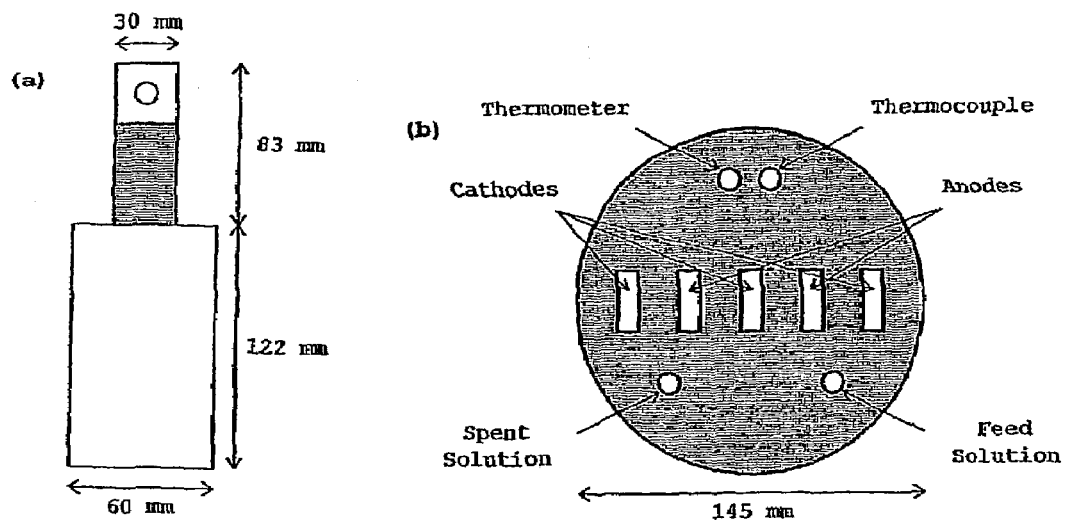
FIG. 3  FIG. 4
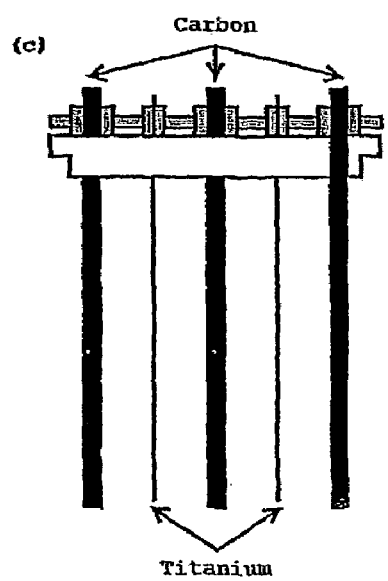
FIG. 5

DOPED MANGANESE DIOXIDES

FIELD OF THE INVENTION

This invention relates to batteries and more particularly to battery electrodes comprised of manganese dioxide doped with at least one element.

BACKGROUND OF THE INVENTION

The Leclanchè cell, which uses an amalgamated zinc anode, an electrolyte of ammonium and zinc chloride dissolved in water, and a manganese dioxide cathode, was first introduced in the 1860s. Since then, manganese dioxide has been used extensively in primary, single-use battery cells and particularly in dry and alkaline manganese dioxide zinc cells. Manganese dioxide has also been employed in various rechargeable batteries, including non-aqueous electrolyte cells having an alkali light metal such as lithium as an active material.

Battery grade manganese dioxide has been derived from naturally occurring manganese dioxide and synthetically produced manganese dioxide. Synthetic dioxide is generally divided into two categories: electrolytic manganese dioxide (EMD) and chemical manganese dioxide (CMD). Because of its high impurity content, naturally occurring manganese dioxide is not generally employed in alkaline or lithium cells. EMD, which is typically manufactured from direct electrolysis of a bath of manganese sulfate and sulfuric acid, is typically a high purity, high density, gamma-manganese dioxide that has been proven to be desirable for use as cathode active material in alkaline and lithium cells. During the electrolysis process, the gamma-EMD is deposited directly on the anode which is typically made of titanium, a lead alloy, or carbon. The EMD deposit is removed from the anode, crushed, ground, washed, neutralized and dried prior to use as an active material in a battery.

Electrolytic manganese dioxide has been a preferred material for use as the cathodic reactant in batteries primarily because of the ability of EMD to provide batteries having significantly improved discharge capacity compared to batteries produced from naturally occurring or chemically produced manganese dioxides. It is generally believed that the improved performance of EMD depends to a large extent on the operating conditions employed during the electrolysis process used to manufacture this material. The published literature teaches that among the more important operating conditions affecting the discharge capacity of a battery is the purity of the electrolyte used in the electrolysis. In fact, the published literature teaches that in order to improve the storage capacity of a battery, it is essential to use electrolytic manganese dioxide that does not contain significant heavy metal impurities. Another factor which is significant to the performance of a battery having an electrode comprised of EMD is the amount of active material present in the battery. In general, it is desirable for the battery to contain as much manganese dioxide as possible within a limited space to provide improved performance. Accordingly, attempts to improve the performance of batteries containing an electrode comprised of EMD have focused on manufacturing techniques that provide highly pure EMD and which provide EMD that can be packed into a high density form.

Other attempts to improve the service performance of alkaline batteries employing manganese dioxide active material include physically blending the manganese dioxide with an additive. Examples of such additives include titanates, such as $BaTiO_3$ or $K_2TiO_3$, $SnO_2$, $Fe_2O_3$—$TiO_2$, $TiO_2$ and $Nb_2O_5$.

SUMMARY OF THE INVENTION

The present invention, in one aspect, is a doped manganese dioxide (or XMD) useful as an active electrode material in both thin film and cylindrical batteries. The doped manganese dioxides provide several potential benefits, including improved electrochemical performance as compared with conventional manganese dioxides. The doped manganese dioxides of this invention comprise manganese, oxygen and at least one dopant deliberately incorporated into the atomic structure of the manganese dioxide.

More specifically the object of the present invention to prepare a composition of matter comprising a doped manganese oxide corresponding to the formula $Mn_{1-x}X_wO_y$, in which w is about 0.000023 to 0.0144, and y ranges from about 1.90 to 2.00, X is at least one dopant selected from the group of: B, Mg, Al, Si, P, Sc, Ti, V, Cr, Fe, Co, Ni, Cu, Zn, Ga, Ge, Sr, Y, Zr, Nb, Ru, Rh, Pd, Ag, In, Sn, Sb, Ba, Ce, Hf, Ta, Re, Os, Ir, Pt, Au and Bi, and in which the manganese, oxygen and the dopant are intermingled atomically. More preferably wherein x is about 0.0046 to 0.0096, and most preferably wherein x is about 0.0056 to 0.0087. This new composition can be prepared by electrodeposition of a solution containing the dopant and zirconium. X can comprise more than one dopant. Such dopant combinations of the present invention include: Ni/Al, Ni/B, Zr/B, Ti/B, Hf/B, Ta/Al, Ta/B, Nb/B, Nb/Al, Zr/Nb, Zr/Al, Zr/Ga, Zr/Ce, Zn/Hf, Ce/B, Ga/B, Ce/Hf, Al/B, Al/Ga, Al/B, Zn/B, Ce/Zn, Ce/Ga, Hf/Al, Hf/Zr, Zn/Zr, Hf/Ga, Ga/Ni, Zn/Ni, Ga/Ag, Ni/In, Hf/Ni, Zr/In, Ag/B, Al/Zn, Ga/Zn, B/Cr, Zn/Cr, Cr/Ni, Cr/Al, Cr/In, Cr/Ga, Cr/Hf, Ag/Ni, Ag/Al, Cr/Ag, Cr/Ce, Cr/Zr, Zr/Ag, Ce/Ag, Cu/Cr, Cu/Zr, Hf/Ag, Zn/Ag, Ru/Zr, Ru/Ce, Ru/Hf, Ru/Al, Zr/Ce/Ni, Ti/Ce/Ni, Ce/Al/Zr, Ti/Ce/Al, Al/Ni/Zr, Al/Ni/Tl, Ce/Al/Ni, Ce/Al/Ru, Zr/Hf/Ni, Zr/Hf/Zn, Ce/Ni/Al/Zr, Zr/Al/Ce/Ti and Zr/Ce/Ni/P.

The electrode grade zirconium manganese oxide has a different morphology relative to undoped EMD. Furthermore the doped manganese oxide of the present invention has a surface area of 50 to 100 $m^2/g$ when measured by the BET method using nitrogen adsorption.

It is a further object of the present invention to make electrodes comprising doped manganese oxide. The electrode grade doped manganese oxide of the present invention can be used to make an electrode for an alkaline battery comprising the doped manganese oxide and a conductive material. Such electrodes exhibit an enhanced discharge when compared to undoped EMDs prepared under the same conditions. Prefereably the combined amounts of the conductive material and the doped manganese oxide comprise at least ninety weight percent of the electrode on a dry basis.

Improved electrode performance has been found when the doped manganese oxide of the present invention has been included in amounts as little as one weight percent on a dry electrode basis. It is more preferred when concentrations of the doped manganese oxide ranges from at least five percent to at least fifteen percent of the electrode dry weight. The conductive material added to the electrode is preferably carbon, and more preferably graphite. The electrode mix can also include electrolytic manganese dioxide as a co-depolarizer.

It is a further object of the present invention to make improved batteries. The above described electrodes can be used as electrodes in batteries or the present invention, preferably as cathodes, with zinc as an active material in the anode and potassium hydroxide as a component of the electrolyte. Such batteries can be conventional cylindrical alkaline batteries, or planar thin film batteries. Cathodes for such planar batteries can be made by fixing the XMD to a conductive substrate. This can be done by depositing the XMD onto the conductive substrate.

These and other features, advantages and objects of the present invention will be further understood and appreciated by those skilled in the art by reference to the following specification, claims and appended drawings.

BRIEF DESCRIPTION OF THE DRAWINGS

FIG. 3 is an elevational view of an electrode used for producing EMD;

FIG. 4 is a top plan view of an electrolytic cell used for producing EMD;

FIG. 5 is a side elevational view of an electrolytic cell used for producing EMD;

DETAILED DESCRIPTION OF PREFERRED EMBODIMENTS

Figure 1:
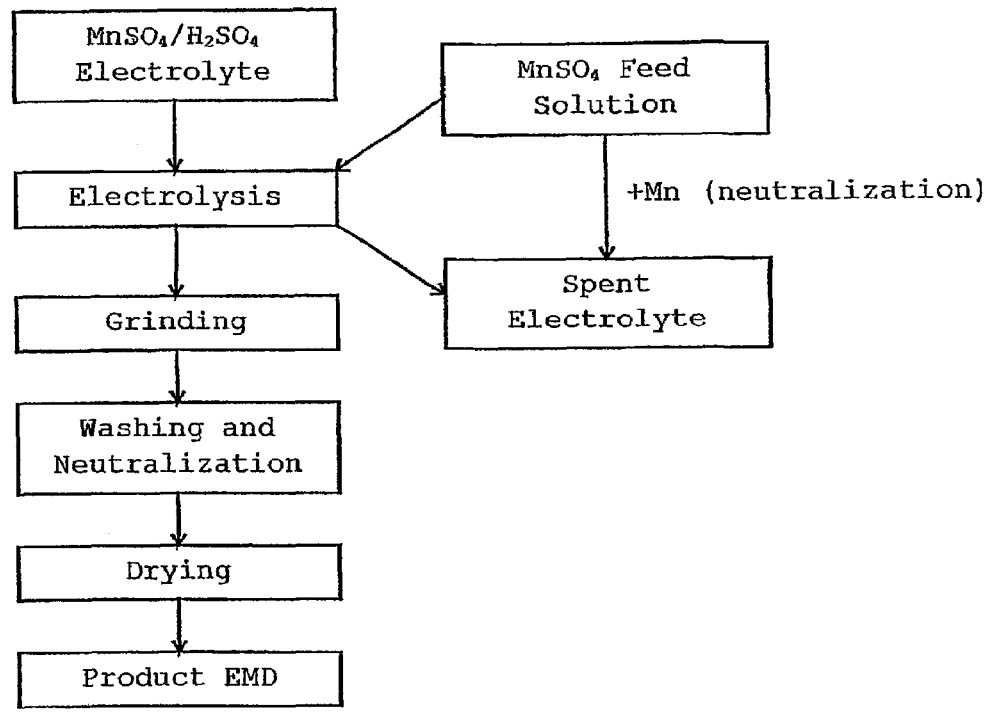
FIG. 1 is a flow chart of the laboratory scale EMD production process.

The doped manganese dioxides of this invention may be prepared using wet chemistry methods, i.e., chemically produced doped manganese dioxides (CMDs) may be prepared according to the invention. More preferably, the doped manganese dioxides may be prepared by electrolysis of acidified manganese sulfate solution which includes at least one soluble dopant species. An important difference between the process of this invention and the known processes of producing electrolytic manganese dioxide is that the electrolysis is performed on a solution containing a minor amount of a dopant ion or atom that is intentionally added. This is contrary to the conventional process of providing electrolytic manganese dioxide in which the amount of any impurities, i.e., ingredients other than manganese sulfate and sulfuric acid, are minimized to provide EMD deposits of the highest possible purity. Accordingly, the expression "dopant" as used herein refers to an element that is intentionally incorporated into the $MnO_2$ structure. This distinguishes a dopant from impurities that are typically present in small amounts in commercially available manganese dioxides.

The manganese sulfate used in the electrolytic processes of this invention may be prepared using conventional refining techniques. A first step in a conventional process for preparing manganese sulfate from manganese dioxide ore involves reduction roasting of the manganese dioxide ore in the presence of coal (carbon) to produce a suitable acid soluble Mn(II) species; i.e.

$$MnO_2 + C \rightarrow MnO + CO \qquad (1)$$

This stage is typically carried out at a temperature of about 950° C.

The reduced ore is then dissolved in sulfuric acid according to the reaction:

$$MnO + H_2SO_4 \rightarrow MnSO_4 + H_2O \qquad (2)$$

Initial purification occurs as a result of pH changes in the leach solution. Insoluble sulfates, such as $BaSO_4$, are removed almost immediately. With the dissolution of more MnO, and hence consumption of $H_2SO_4$ (Eqn (2)), the pH increases to about 1.9 at which point precipitation of potassium jarosite occurs; i.e.

$$K_2SO_4 + 3Fe_2(SO_4)_3 + 12H_2O \rightarrow 2KFe_3(SO_4)_2(OH)_6 + 6H_2SO_4 \qquad (3)$$

This removes $K^+$ and $Fe^{3+}$ from the leach solution. Additional MnO is added to the leach solution until a final pH of about 4.5 is reached. During this neutralization stage further purification occurs resulting in the precipitation of a number of trace elements. $Al_2O_3$ and $SiO_2$ precipitate during this stage, as does goethite (FeOOH), which has the added feature of adsorbing metal ions of Mo, Sb and As.

Further purification can be achieved through the addition of NaSH; i.e.

$$NaSH + H_2SO_4 \rightarrow H_2S + Na^+ + HSO_4^- \qquad (4)$$

$$M^{2+} + H_2S \rightarrow MS + 2H^+, \text{ where } M^{2+} \text{ is a metal ion} \qquad (5)$$

This results in the precipitation of all non-manganese transition metal ions. Examples include $Ni^{2+}$, $Co^{2+}$ and $Cu^{2+}$.

Electrolysis of the purified $MnSO_4$ solution leads to EMD formation. The electrolysis reactions can be described by:

$$\text{Anode: } Mn^{2+} + 2H_2O \rightarrow MnO_2\downarrow 4H^+ + 2e^- \qquad (6)$$

$$\text{Cathode: } 2H^+ + 2e^- \rightarrow H_2\uparrow \qquad (7)$$

$$\text{Overall: } Mn^{2+} + 2H_2O \rightarrow MnO_2\downarrow H_2\uparrow + 2H^+ \qquad (8)$$

Typical anode materials include titanium, carbon or lead, while typical cathode materials include carbon, copper or lead. Electrolysis is the key stage in producing the desired battery grade material. Purity of the feed electrolyte ensures the chemical purity of the EMD product, while controlled anodic current density, temperature, $Mn^{2+}$ and $H_2SO_4$ electrolyte concentration determine the EMD structure best suited to provide the best compromise between electrochemical and physical properties of the end product. Typical electrolysis conditions are an anodic current density between 55 and 75 A $m^{-2}$, temperatures in excess of 95° C. and $Mn^{2+}$/$H_2SO_4$ mole ratios of about 2.

The final stage in production involves collecting the deposited EMD and grinding it to the appropriate particle size. Following this the EMD powder undergoes water washing and neutralization to remove residual electrolyte, and drying.

This technique of manganese dioxide production is capable of generating materials of high purity and electrochemical activity and is generally described in the flow sheet of FIG. 1.

The electrolysis process of the present invention departs from the conventional electrolysis used to manufacture EMD. Specifically, during or before electrolysis in accordance with this invention, a minor amount of a dopant is deliberately added to modify the product deposited on the anode during electrolysis. The dopant is introduced into the solution subjected to electrolysis in the form of a compound which disassociates in the solution to form an ion.

Laboratory-Scale EMD Production

To ensure that the EMD samples generated in the laboratory were representative of commercial materials, the synthesis procedures were very similar. The main differences are;

(i) the production scale is much smaller in the laboratory; and, (ii) the electrolyte purification stages were absent in laboratory-scale production due to the use of high purity $MnSO_4.H_2O$ and manganese metal as the sources of manganese in the electrolyte.

Figure 2:
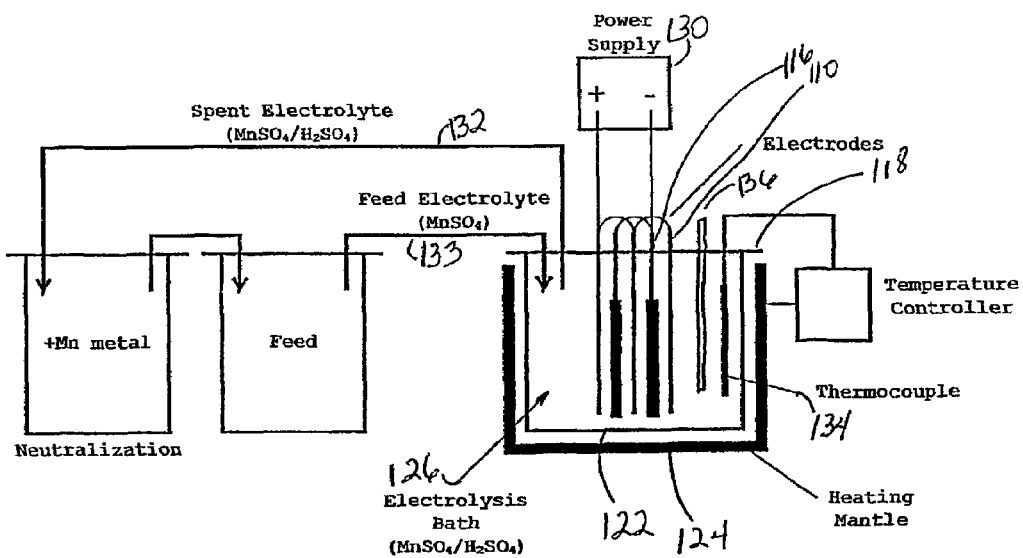
FIG. 2 is a schematic diagram of a laboratory scale apparatus for producing EMD.

The flow chart and schematic diagram for laboratory-scale EMD production are shown in FIGS. 1 and 2, respectively.

Solution Preparation

Each EMD deposition experiment began with the preparation of appropriate electrolyte ($MnSO_4/H_2SO_4$) and feed ($MnSO_4$) solutions from high purity $MnSO_4.H_2O$ and concentrated $H_2SO_4$. Two (2) liters of electrolyte solution and about 5 liters of feed solution were prepared from these reagents. Additional feed solution was prepared by neutralizing spent electrolyte.

Electrode Preparation

Electrodes were manufactured from sheets of titanium (1 mm thick; anode) and carbon (3 mm thick; cathode). The appearance and dimensions of these electrodes 110 is shown in FIG. 3. The region above the shoulder 112 on each titanium anode 110 was covered with polytetrafluoroethylene (PTFE) tape 114 (e.g., TEFLON® tape) to provide a uniform, well-defined electrode area (146.4 $cm^2$ per electrode) for EMD deposition.

Before use the titanium anodes 110 were sandblasted to remove any passive oxide layer on the surface, as well as any residual EMD from previous deposition experiments. The carbon cathodes 116 were boiled in a dilute $H_2SO_4$ solution (7% v/v) to remove any impurities on the carbon surface or in the pores.

The electrodes were mounted in the PTFE lid 118 of the electrolysis cell (FIGS. 4 & 5). Three cathodes 116 and two anodes 110 were used in each cell, in an alternating arrangement. This was to ensure a uniform current distribution on both sides of each anode 110. The electrodes 110 and 116 were supported and kept a uniform distance apart by a threaded PTFE rod 120 passing through the top of each electrode, as shown in FIG. 5.

Cell Assembly

A 2 L glass beaker 122 placed in an appropriate heating mantle 124 was used as the electrolysis cell 126. The electrolyte prepared previously was poured into electrolysis cell 126 and pre-heated to the temperature of the deposition. Electrodes 110 and 116 were inserted into the electrolyte. Any gaps between PTFE lid 118 and electrolysis cell 126 or between lid 118 and electrodes 110 and 116 were sealed using either insulating tape or PTFE cord to avoid excessive evaporation during electrolysis.

Appropriate electrical connections 128 were made between a power supply 130 and electrodes 110 and 116. Tubes 132 and 133 for removing spent electrolyte and adding feed electrolyte respectively were placed in electrolysis cell 126, as were a thermocouple 134 and a thermometer 136.

Electrolysis

The electrochemical reactions that occur during electrolysis are described in Eqns (6) and (7), while Eqn (8) describes the overall cell reaction. The anodic current density determines the rate of EMD deposition, which in turn has an effect on the properties of the resultant EMD. The first stage of electrolysis involves depositing EMD at a very low current density (about 1 $A\ m^{-2}$) for a short period of time (about 15 minutes). The purpose of this stage is to generate a very thin layer of dense (conductive) EMD on the titanium surface and so prevent anode passivation during the latter stages of electrolysis. During this stage feed solution was not added to the cell, nor is spent electrolyte removed from the cell.

With the deposition of a thin EMD layer complete, the anodic current density was increased to that required for the experiment. At the same time, the flow of feed solution and spent electrolyte was initiated. Throughout the course of EMD deposition (typically 4days) the concentration of $Mn^{2+}$ and $H_2SO_4$ in the electrolysis bath was monitored and adjusted, if necessary, by slight modifications in the feed solution and spent electrolyte flow rates. The feed solution used in each experiment was generated mostly from the spent electrolyte. The spent electrolyte coming from electrolysis cell 126 has a deficiency of $MnSO_4$ and an excess of $H_2SO_4$. Reacting this solution with manganese metal neutralizes $H_2SO_4$ and replenishes $MnSO_4$. After filtering to remove any suspended fine particles and adjusting the $MnSO_4$ concentration (with additions of either water or solid $MnSO_4.H_2O$) the neutralized solution is ready for use.

During each electrolysis experiment it was not uncommon for a small degree of evaporation to occur. Distilled water was added to the electrolysis cell to maintain a constant electrolyte level.

Sample Treatment

At the completion of the electrolysis period power supply 130 and a pump controlling the feed solution and spent electrolyte were switched off. The electrodes were removed from the electrolysis cell immediately to avoid any additional chemical reactions altering the EMD properties. After cooling, the EMD-coated titanium anodes were detached from the PTFE cell lid 118 and immersed in water (about 1 L) for preliminary washing. After about 30 minutes each anode 110 was removed from the water and the EMD stripped from the surface by gently twisting the anode 110. Each EMD sample was broken up into smaller pieces (5-10 mm) using a mortar and pestle. These smaller pieces were then re-immersed in about 1 L of water. After at least 5 hours the majority of water was decanted from the sample, which was then placed on a watch glass and dried in air at 70° C.

The dry EMD pieces were ground into a powder (about 106 µm) using a bench-top scale micro-mill. An intermittent grinding procedure was used (20-30 seconds grinding each time) so as not to alter the EMD properties through heat generation.

Each sample of EMD powder was then suspended in about 1 L of water. After about 15 minutes the EMD was allowed to settle so the supernatant water could be decanted. This washing step was repeated twice. During the final wash, a pH probe was inserted and the suspension was neutralized by the addition of 0.5 M NaOH. Because of considerable hysteresis involved with this neutralization procedure, neutralization was achieved in several incremental steps with several minutes between NaOH additions. When the pH had stabilized at 7.0 the suspension was allowed to settle so the supernatant water could be decanted. The EMD was again suspended in about 1 L of water and neutralized to a pH of 7.0. The suspension was then filtered through a Whatman No. 6 filter paper and the solid dried in air at 70° C. The dry sample was transferred to an air-tight container for storage and characterization.

The equipment allows control of four important independent variables during EMD production; i.e. temperature, current density, $Mn^{2+}$ concentration and $H_2SO_4$ concentration. Conditions considered are listed in Table 1.

TABLE 1

EMD deposition conditions considered.

| Variable | Levels Considered |
|---|---|
| Current Density | 45, 65, 85 and 100 A m$^{-2}$ (±0.2 A m$^{-2}$) |
| Temperature | 65, 75, 85, 93 and 97° C. (±2° C.) |
| MnSO$_4$ Concentration | 25, 40, 55 and 70 g L$^{-1}$ (±3 g L$^{-1}$) |
| H$_2$SO$_4$ Concentration | 15, 25, 35 and 45 g L$^{-1}$ (±2 g L$^{-1}$) |

Most of the dopants that were evaluated are water soluble and also soluble in $MnSO_4/H_2SO_4$ solution. However, some dopants were not soluble (e.g., Ti, Ge and Nb). To introduce such dopants to the plating bath a solution of n-butoxide salt was prepared in methanol; e.g. Ti (n-butoxide) in methanol. This solution was then introduced to the plating bath. Upon introduction to the plating bath the methanol immediately evapoated leaving the metal ion in the plating bath electrolyte.

Examples of dopants that may be used in this invention include dopants comprising at least one element selected from the group consisting of B, Mg, Al, Si, P, Sc, Ti, V, Cr, Fe, Co, Ni, Cu, Zn, Ga, Ge, Sr, Y, Zr, Nb, Ru, Rh, Pd, Ag, In, Sn, Sb, Ba, Ce, Hf, Ta, Re, Os, Ir, Pt, Au and Bi. The dopants may be added to the solution in the form of a metal sulfate, a metal halide, etc., either dry or already in solution. Boron and phosphorus ions may be introduced as boric and phosphoric acid respectively. Silicon may be introduced as a silicate ion or silane (e.g. triethoxysilane). Preferred dopants include those comprising an element selected from the group consisting of Ti, Zr, and Hf. Other preferred dopants include those comprising an element selected from the group consisting of B, Al, Ga, Si and P. Another group of presently preferred dopants include those comprising an element selected from the group consisting of Sn, Ge, Sb, Ce, Au and Pt.

Examples of dopant materials that have been successfully used for preparation of the doped manganese dioxides of the this invention include: $Bi_2(SO_4)_3$, Ti(III) sulfate, Ti(IV) butoxide with methanol, $VO_2$, Iron (III) sulfate hydrate, $Ni(SO_4)$—$H_2O$, Ce(III) sulfate, $Al_2(SO_4)_3$, $Cr_2(SO_4)_3$, $Hf(SO_4)_2$, $Zn(SO_4)$-$7H_2O$, $Zr(IV)(SO_4)_2$.$4H_2O$, $H_3BO_3$, $Ga_2(SO_4)_3$, $H_3PO_4$, $CuSO_4$-$5H_2O$, $In(SO_4)_3$-$9H_2O$, Si (from TEOS), $Sb_2(SO_4)_3$, $C_{16}H_{36}O_4Ge$ with methanol, $Sr(SO_4)$, $Ba(SO_4)$, $Ag_2(SO_4)$, $PdWO_4$-$2H_2O$, Ti/Zr codopants, $Sn(SO_4)_3$, $ReCl_3$, $Y_2(SO_4)_3$, $Sn(SO_4)_3$, $CoSO_4$-$7H_2O$, $ScCl_3$, $Rh_2(SO_4)_3$, Nb-n-butoxide with methanol, $AuCl_3$, $H_2PtCl_6$—$H_2O$, $MgSO_4$, $IrCl_3$, $RuCl_3$—$H_2O$, $OsCl_3$—$H_2O$, $TaCl_5$, Nb/Al codopants, AuCl, Al/Ta codopants, Ni/Al codopants, Ni/B codopants, Zr/B codopants, Zr/B codopants, Ti/B codopants, Zr/Ni codopants, Zr/Nb codopants, Ta/B codopants, Nb/B codopants.

Suitable amounts of dopant were added to the solution that is subjected to electrolysis to form a XMD and typically include levels as low as about 25 ppm (i.e., 25 parts by weight of the dopant element or ion incorporated into the deposited doped manganese dioxide per 1,000,000 parts by weight of the solution) and at least as high as 2,500 ppm for some dopants, with typical dopant levels being from about 25 ppm to about 10,000 ppm. Examples of suitable amounts of dopant that may be used during synthesis of a XMD in accordance with the invention are listed below in the illustrative examples.

Except for the deliberate addition of dopant, the solution and electrolysis condition may be similar to those used in conventional electrolysis processes for forming EMD. The electrolysis may be conducted at a solution temperature of from about 85° C. to about 100° C., and more preferably from about 93° C. to about 97° C. A suitable current density during the electrolysis is from about 30 A/m$^2$ to about 100 A/m$^2$, and more preferably from about 30 A/m$^2$ to about 65 A/m$^2$. A suitable amount of sulfuric acid in the solution may be from about 10 g/L to about 100 g/L, with more typical sulfuric acid concentrations being from about 30 g/L to about 40 g/L. A suitable amount of manganese ion in the solution may be from about 150% to about 250% of the weight of $H_2SO_4$ in the solution, i.e. the ratio $Mn^{2+}/H_2SO_4$ is from about 1.5 to about 2.5 on a weight basis.

The electrolysis process may be performed as a batch process in which manganese and dopant ion concentrations become depleted during electrolysis, as a semi-batch process in which manganese and/or dopant ions are added at one or more predetermined times during the electrolysis process, or as a continuous process in which manganese and dopant ions are added continuously while depleted solution is continuously withdrawn to maintain a constant concentration of manganese and a constant concentration of the dopant ion in the solution.

The doped manganese dioxides that are formed during the processes of this invention may be collected, ground, washed and neutralized in accordance with any of the known processes used during the production of conventional EMD.

A single dopant or a plurality of dopants may be added to the solution that is subjected to electrolysis to form the doped manganese dioxides of this invention. Examples of doped manganese dioxides having a binary dopant system that have exhibited properties which suggest utility in batteries includes Ni/Al, Ni/B, Zr/B, Ti/B, Hf/B, Ta/Al, Ta/B, Nb/B, Nb/Al, Zr/Nb, Zr/Al, Zr/Ga, Zr/Ce, Zn/Hf, Ce/B, Ga/B, Ce/Hf, Al/B, Al/Ga, Al/B, Zn/B, Ce/Zn, Ce/Ga, Hf/Al, Hf/Zr, Zn/Zr, Ce/Al, Hf/Ga, Ce/Al, Hf/Ga, Ga/Ni, Zn/Ni, Ga/Ag, Ni/In, Hf/Ni, Ce/Ni, Zr/In, Ag/B, Al/Zn, Ga/Zn, B/Cr, Zn/Cr, Cr/Ni, Cr/Al, Cr/In, Cr/Ga, Cr/Hf, Ag/Ni, Ag/Al, Cr/Ag, Cr/Ce, Cr/Zr, Zr/Ag, Ce/Ag, Cu/Cr, Cu/Zr, Hf/Ag, Zn/Ag, Ru/Zr, Ru/Ce, Ru/Hf, Ru/Al, Ti/Ni, Al/Ti, Cu/Hf, Hf/Ni, Sr/Zr, Sr/Hf, Ti/Hf and Ti/Ce. Examples of doped manganese dioxides having a ternary or quaternary dopant system that have exhibited properties suggesting utility in batteries include Ce/Ni/Al/Zr, Zr/Al/Ce/Ti, Zr/Ce/Ni/P, Zr/Ce/Ni, Ti/Ce/Ni, Ce/Al/Zr, Ti/Ce/Al, Al/Ni/Zr, Al/Ni/Tl, Ce/Al/Ni, Ce/Al/Ru, Zr/Hf/Ni and Zr/Hf/Zn. When multiple dopants are used, the total amount of all dopants added to the solution may typically be present in an amount of from about 25 ppm to at least about 10,000 ppm, with preferred total dopant levels typically being from about 25 ppm to about 1,000 ppm.

The doped manganese dioxides of this invention are preferably comprised of manganese dioxide in the gamma phase. Unlike certain known EMD compositions in which high purity EMD is physically blended with another solid material, such as $BaTiO_3$, $K_2TiO_3$, $SnO_2$, $Fe_2O_3$—$TiO_2$, $TiO_2$ or $Nb_2O_5$, to form a particulate mixture, the dopant or dopants used in this invention are present in solution during electrolysis as the manganese ions are reacted to form manganese dioxide on the anode, or during preparation of CMD. The dopant or dopants are incorporated into the crystal structure of the manganese dioxide that is deposited during electrolysis or formed during preparation of CMD. In other words, the dopant or dopants of this invention are not believed to be physically blended with the manganese dioxide. Instead, the dopant or dopants are believed to be atomically associated with the manganese and oxygen atoms. The exact nature of the chemical association between the dopant and the manganese and oxygen atoms has not been determined, and may be different for different dopants. In any case, the dopants are not distinguishable as a discrete chemically or structurally different phase by conventional techniques such as X-ray diffraction or electron microscope analysis.

For purposes of interpreting the meaning of "gamma-$MnO_2$" as used in this document, gamma-$MnO_2$ may be characterized in terms of its well known properties or X-ray diffraction pattern.

Figure 6:
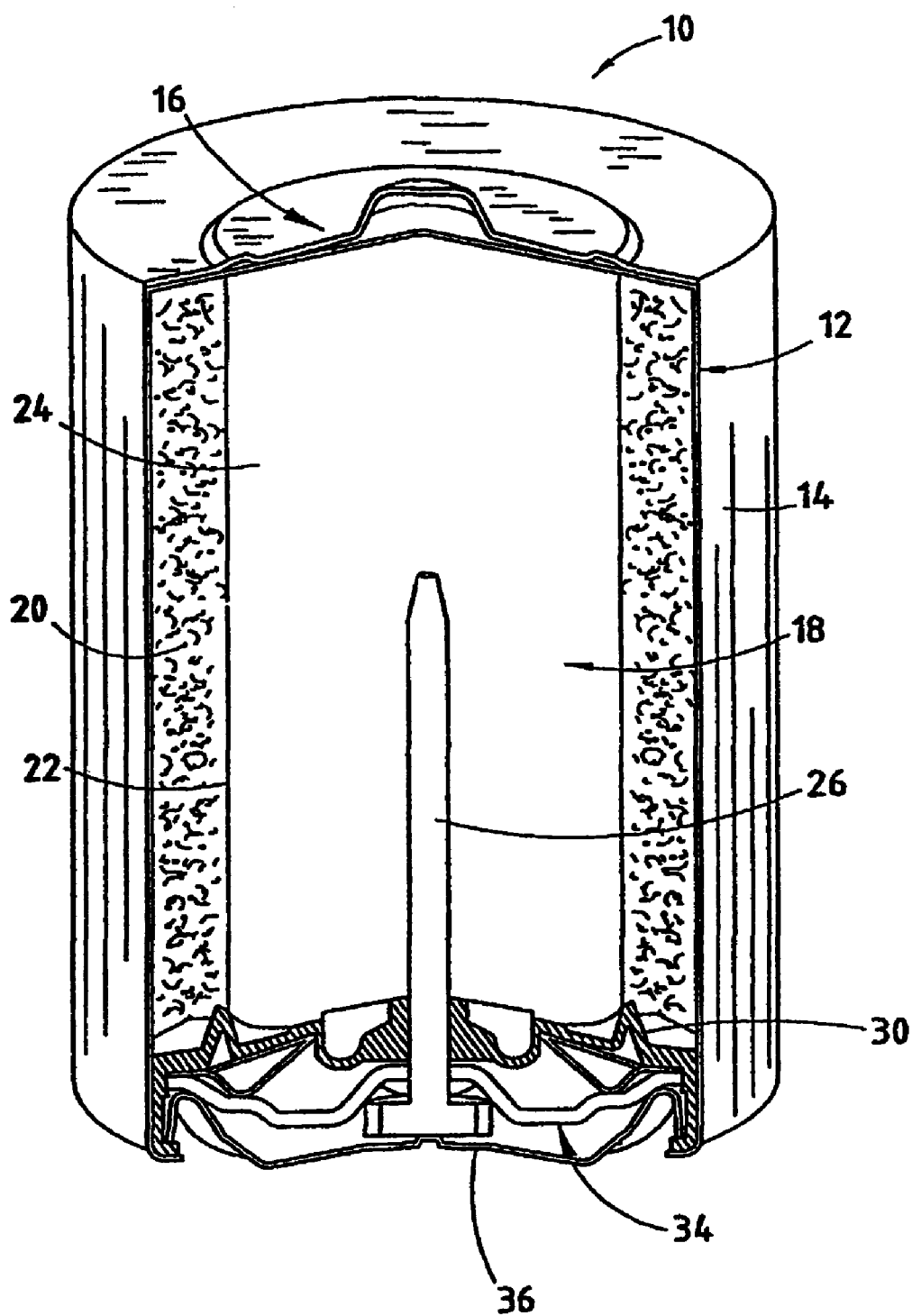
FIG. 6 is a cutaway perspective view of an example of an electrochemical cell constructed in accordance with the present invention.

The XMD of this invention are useful active materials for the electrode of a battery. which may be formed of steel. Referring to FIG. 6, a cut away view of a cylindrical alkaline electrochemical cell 10 is shown. Alkaline cell 10 includes a steel can 12 having a cylindrical shape with a closed bottom-end and an open top end. A metalized, plastic film label 14 is formed about the exterior surface of steel can 12, except for the ends of steel can 12. At the closed end of steel can 12 is a positive cover 16 preferably formed of plated steel. Film label 14 is formed over the peripheral edge of positive cover 16. A cathode 20, typically formed of a mixture of manganese dioxide, graphite, a 45% potassium hydroxide solution, water, a binder and additives, is formed about the interior surface of steel can 12. A separator 22, which is preferably formed of a non-woven fabric that prevents migration of any solid particles in the cell, is disposed about the interior surface of cathode 20. An alkaline electrolyte 24, preferably formed of potassium hydroxide (KOH), is disposed in the can 12, preferably within the interior of separator 22. An anode 18, preferably formed of zinc powder, a gelling agent, and additives is disposed within electrolyte 24 in contact with a current collector 26, which may include a brass nail. Accordingly, cathode 20 is configured as the positive electrode of the cell and the anode 18 is configured as the negative electrode of the cell.

A seal 30, preferably of nylon, is formed at the open end of steel can 12 to prevent leakage of the active materials contained in steel can 12. Seal 30 contacts a metal washer 28 and an inner cell cover 34, which is preferably formed of steel. A negative cover 36, which is preferably formed of plated steel, is disposed in contact with current collector 26 by a weld. Negative cover 36 is electrically insulated from steel can 12 by nylon seal 30. Current collector 26 is electrically connected to negative cover 36. The anode 18 of the present invention preferably contains zinc powder as the electrochemically active material. The cathode electrode 20 of the present invention is typically formed of electrolytic manganese dioxide (EMD) as the electrochemically active material. In addition, anode 18 and cathode 20 of the present invention may also contain one or more additives. It is contemplated that other anodes, cathodes, electrolytes, and separators may be used in accordance with the present invention.

In the particular embodiment shown, battery 10 is a primary alkaline battery. Accordingly, cathode 32 is composed of about 2 to 15 wt. % of an electrically conductive material, 5-80 wt. % or more of a XMD made in accordance with the present invention, and other optional ingredients as discussed below. In addition conventional EMD may be added to the cathode. The aggregate amount of the XMD and the EMD should comprise about 80% of the cathode weight. In this regard, wt. % refers to the amount of indicated ingredient in relation to the dry weight of all ingredients in the cathode. Cathodes for alkaline batteries are normally made with aqueous materials such as KOH solutions, solutions or dispersions of resinous binders and solutions or dispersions of slip agents and other adjuncts. The weight percents given herein for the ingredients of the cathode are based on the total dry weight of these ingredients, the water content of these ingredients being excluded.

The alkaline battery shown in FIG. 6 is illustrative of a battery employing the XMD of this invention in the electrode of a battery. However, the doped manganese dioxides of this invention may be employed in various other types of batteries, including both primary and secondary batteries, and batteries having various configurations.

Certain aspects of the invention are described below with respect to specific illustrative examples. These examples are intended to facilitate a better understanding of the principles and advantages of the invention. However, the scope of the invention is to be determined by reference to the appending claims, and is not limited by the illustrative examples.

EXAMPLES OF EMD MANUFACTURE

Example 1

Doped EMD; e.g., $Mg^{2+}$ Doped EMD

In this example the apparatus used was exactly the same as that described above and shown in FIGS. 2-5. Sufficient $MgSO_4$ was added to the cell electrolyte (aqueous $MnSO_4/H_2SO_4$) to make the concentration of $Mg^{2+}$ 1000 ppm. Also, sufficient $MgSO_4$ was added to the feed solution (aqueous $MnSO_4$) to make the concentration of $Mg^{2+}$ 1000 ppm. Electrolysis leading to XMD deposition was carried out as described previously.

Example 2

Doped EMD; e.g., $Mg^{2+}$ Doped EMD

This method is a more controlled alternative to that described in Example 1. The apparatus necessary for this example is similar to that used to prepare non-doped EMD, with the addition of another pump to be used for the addition of dopant to the electrolysis bath. Also necessary for this technique is a method for measuring the concentration of dopant in the electrolysis bath. Sufficient $MgSO_4$ was added to the cell electrolyte prior to electrolysis to make the concentration of $Mg^{2+}$ 5000 ppm. The feed solution was the same as that used when non-doped EMD was prepared. Another solution of 1000 ppm $Mg^{2+}$ (from $MgSO_4$) was also prepared. Electrolysis leading to XMD deposition was carried out similar to that described previously. The concentration of $Mg^{2+}$ in the electrolysis bath was monitored continuously and fed back to the pump controlling $MgSO_4$ solution addition. Based on the feedback information $MgSO_4$ solution flow into the electrolysis cell was either stopped or started; e.g., if the electrolysis cell $Mg^{2+}$ concentration was less than 1000 ppm the pump flow rate was increased; if it was above 1000 ppm the flow was stopped.

Example 3

Doped EMD; e.g., $Nb^{5+}$ Doped EMD
(Nb(n-butoxide)$_5$)

In this case $NB_2(SO_4)_5$, or similar chloride or nitrate salt, was not available so an alternative approach had to be developed. The electrolysis cell was prepared as described previously and in Example 2, except that for this example no dopant was included in the electrolyte and the dopant solution contained 5000 ppm of $Nb^{5+}$ (from $Nb(n\text{-butoxide})_5$) in methanol. This solution was pumped into the electrolysis cell just prior to electrolysis to raise the $Nb^{5+}$ level in the electrolyte to 1000 ppm, and was continually added to the electrolysis bath after the onset of electrolysis to maintain 1000 ppm of $Nb^{5+}$ in the cell. A benefit of this method of dopant introduction is that the methanol solvent evaporates immediately from the electrolysis cell (90-100° C.) leaving $Nb^{5+}$ in solution. This technique was used for $Ge^{4+}$, $Nb^{5+}$ and $Ti^{4+}$ dopant addition.

Example 4

Doped CMD; e.g., $Mg^{2+}$ Doped CMD ($MgSO_4$)

In this example, the reaction between $Mn^{2+}$ and $MnO_4^-$ in an acidic environment was used to generate $\gamma\text{-}MnO_2$; i.e.,

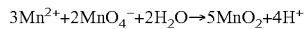

$$3Mn^{2+}+2MnO_4^-+2H_2O \rightarrow 5MnO_2+4H^+$$

58.31 g of $MnSO_4 \cdot H_2O$, 98.08 g of concentrated $H_2SO_4$ and 4.95 g of $MgSO_4$ were dissolved in 0.3 L of de-ionized water and then allowed to cool to room temperature. The solution was then transferred completely to a 0.5 L volumetric flask and the remaining volume made up with de-ionized water. 36.80 g of NaOH and 32.64 g of $NaMnO_4$ were dissolved in 0.3 L of de-ionized water. After cooling to room temperature solution was transferred completely to another 0.5 L volumetric flask and the remaining volume made up with de-ionized water. The concentration of these solutions are such that the reaction above is stoichiometric. Also, NaOH was included in the $MnO_4^-$ solution to neutralize the acid generated during manganese dioxide precipitation, and hence keep the solution pH constant. The solution containing $Mn^{2+}$ was transferred to a 2 L beaker and heated to 80° C. using a heating mantle and temperature controller. The solution containing $MnO_4^-$ was transferred to a 1 L beaker and heated on a hot-plate to about 70° C. The $MnO_4^-$ solution was then added to the $Mn^{2+}$ solution at a rate of 0.05 L h$^{-1}$. When the addition was complete the suspension was allowed to equilibrate for 1 hour at 80° C. before being filtered, washed and then dried.

Example 5

A series of experiments were conducted in an apparatus comprising a base having a plurality of electrodes arranged in an array format to evaluate parameters that influence XMD synthesis, and to characterize the performance (battery utility) of various doped manganese dioxide materials. These experiments were conducted using known combinatorial methods.

For these experiments, the base or substrate was a quartz disk (about 0.1 centimeter thick). A plurality of electrodes were provided on the base or substrate by employing physical deposition processes and photolithographic processes of the type that are commonly employed in the fabrication of electronic devices from semi-conductor materials. More specifically, the electrodes were prepared by first spin-coating a layer of a photoresist material onto a flat surface of the quartz disk. The thickness of the photoresist layer was about 3 to 5 microns. Selected areas of the photoresist layer were exposed to ultraviolet radiation through a mask. The areas of the mask that were opaque to the ultraviolet radiation corresponded with the locations on the quartz base or substrate where the electrodes and electrically conductive paths were to be located. The areas of the photoresist layer that were exposed to ultraviolet radiation were cured and remained in place on the quartz base or substrate upon contacting the substrate with a developer solvent, whereas the areas of the photoresist layer that were not exposed to ultraviolet radiation were easily removed upon contact with the developer solvent. Following development, the base was dried, and a very thin layer (about 100 Å) of titanium was deposited over the surface of the base on which the exposed and developed photoresist was deposited. The titanium deposition was achieved using radio frequency sputtering. The entire area of the base was covered by the titanium layer. After the titanium layer was deposited, the base was ultrasonicated in acetone. This treatment caused the previously exposed photoresist material to dissolve. As a result, all of the titanium that covered the exposed photoresist material was removed, leaving only the titanium that was sputtered directly onto the base. An array of 64 titanium electrodes, each about 1 millimeter in diameter was formed on the substrate. To protect the conductors on the surface of the quartz base and to limit deposition to a predetermined area on each of the electrodes, a photoresist material was deposited over the surface of the base on which the electrodes were deposited, exposed to ultraviolet radiation through a mask, and developed to provide a protective barrier over the conductors and edges of the electrodes.

The prepared base carrying 64 titanium electrodes of equal surface area was attached to a housing member which together with a base defined an electrochemical cell volume. The base was mounted on a heating apparatus to precisely control the temperature at the electrodes. A platinum counter electrode was positioned in the cell volume, and electrolyte was added either manually or through the use of an automated pumping system. The automated pumping system consisted of five electrolyte injection tubes and one electrolyte removal tube. Using the five injection tubes, electrolytes with a variety of different compositions were prepared in the electrochemical cell volume. This was achieved by the addition of each electrolyte component through an individual injection tube, i.e., $MnSO_4$, $H_2SO_4$, dopant solutions, and water were added through different injection tubes as required. Thorough mixing of the electrolyte was achieved through the use of an argon gas dispersion tube. After the appropriate electrolyte had been prepared in the electrochemical cell, the heating apparatus was turned on and the electrolyte was allowed to heat up to a desired temperature. The deposition current to each of the 64 electrodes was controlled with a 64 channel potentiostat/galvanostat. Each electrode in the array was connected to a separate working electrode from the array. The counter and reference electrode connections from each channel were connected to the platinum counter electrode in the cell, making it common for each electrode. Cell voltage versus time data was recorded for each electrode in the array. The electrolyte in the cell was changed by using the automated pumping system. At the conclusion of each deposition (which may involve one or more of the electrodes), the electrolyte was pumped out through the electrolyte removal tube, and water was pumped into the cell to rinse the electrode and cell. The rinse water was pumped out using the electrolyte removal tube. After three rinsing steps, the new electrolyte was added to the cell. After XMD had been deposited on each of the electrodes in the array, the heating apparatus was turned off, and the cell was rinsed thoroughly with water. Once cleaned, the electrode array was removed from the cell and dried in air at 100° C.

EMD Synthesis

In all cases, XMD was anodically deposited onto each 1 mm$^2$ titanium electrode by the constant current electrolysis of a hot (92° C.), acidic ([$H_2SO_4$]=35 g L$^{-1}$) solution of $MnSO_4$ (55 g L$^{-1}$). Control of the deposition was achieved using a 64 channel Arbin potentiostat/galvanostat, one Arbin channel per array electrode. During EMD deposition the electrode voltage was recorded as a function of time. The variables that were considered were deposition current density (30, 40, 60 and 100 Am$^{-2}$) and dopant concentration (25, 50, 100 AND 1000 ppm) in the electrolyte. It should be pointed out that while different deposition current densities were tested the amount of charge passed during XMD deposition was the same for all experiments. Under these conditions a single XMD dopant could be characterized by 16 experiments, while an XMD containing a binary dopant combination could be characterized by 64 experiments.

Individual dopants that were tested include: B, Mg, Al, Si, K, Sc, Ti V, Cr, Fe, Co, Ni, Cu, Zn, Ga, Ge, Sr, Y, Zr, Nb, Ru, Rh, Pd, Ag, In, Sn, Sb, Ba, Hf, Ta, Re, Os, Ir, Pt, Au, Bi and Ce.

Binary XMD dopants that were tested include: Ni/Al, Ni/B, Zr/B, Ti/B, Ta/Al, Ta/B, Nb/B, Nb/Al, Zr/Nb, Ti/Zr and Zr/Ni.

Electrode Characterization

Once the XMD samples had been prepared the array was washed thoroughly with de-ionized water to remove excess electrolyte and then dried. When dry, the array was mounted into the discharge electrochemical cell and covered with 9 M KOH. At this time the open circuit voltage of each array electrode was measured. Following this, each electrode in the array was subjected to two voltage steps. The first step was from the open circuit voltage to −0.4 V (versus the Hg/HgO reference electrode), where it was held for 240 s. This step covered the first electron reduction region for manganese dioxide. The second step followed immediately and was from −0.4 V to −0.6 V, where it was held for a further 60 s. This voltage step covered the second electron reduction region. The cathodic current that flowed after each step in voltage was recorded as a function of time. This raw data was then used to calculate the electrode capacity and utilization.

Data Analysis

Each electrode studied was characterized by five measurements. These were:

(i) Average Plating Voltage: Average electrode voltage during XMD deposition.

(ii) Open Circuit Voltage: Voltage of the XMD in 9 M KOH prior to any discharge.

(iii) Capacity Utilization: During XMD deposition, in addition to the electrode voltage, the deposition current (I; A) was also recorded as a function of time (t; s). Using this information we can calculate how much charge (Q; C) was passed in depositing the XMD; i.e., $$Q = It \quad (9)$$

Eqn (1) was also used to determine the cathodic charge passed during discharge. Comparing the cathodic charge ($Q_c$; C) realized during discharge to the anodic charge ($Q_a$; C) used in XMD deposition gives us the capacity utilization; i.e., $$\text{Capacity Utilization} = \frac{2 \times Q_c}{Q_a} \times 100\% \quad (10)$$

The factor of 2 used in Eqn (10) takes into consideration the fact that XMD deposition is nominally a two electron process, while XMD discharge is a one electron process. For the purposes of comparing electrodes, the capacity utilization 180 s after the voltage step to −0.4 V was used.

(iv) Second Electron Capacity: The final piece of information extracted from the raw data is a comparison between the capacity realized during the first and second voltage steps; i.e., $$\text{Capacity Ratio} = \frac{Q_2}{Q_1 + Q_2} \quad (12)$$

where $Q_1$ and $Q_2$ are the capacities realized during the first and second voltage steps, respectively. The data was treated in this way, instead of just reporting $Q_2$, because a different capacity was extracted from each electrode during the first voltage step.

Results and Discussion

Average Plating Voltage

Figure 7:
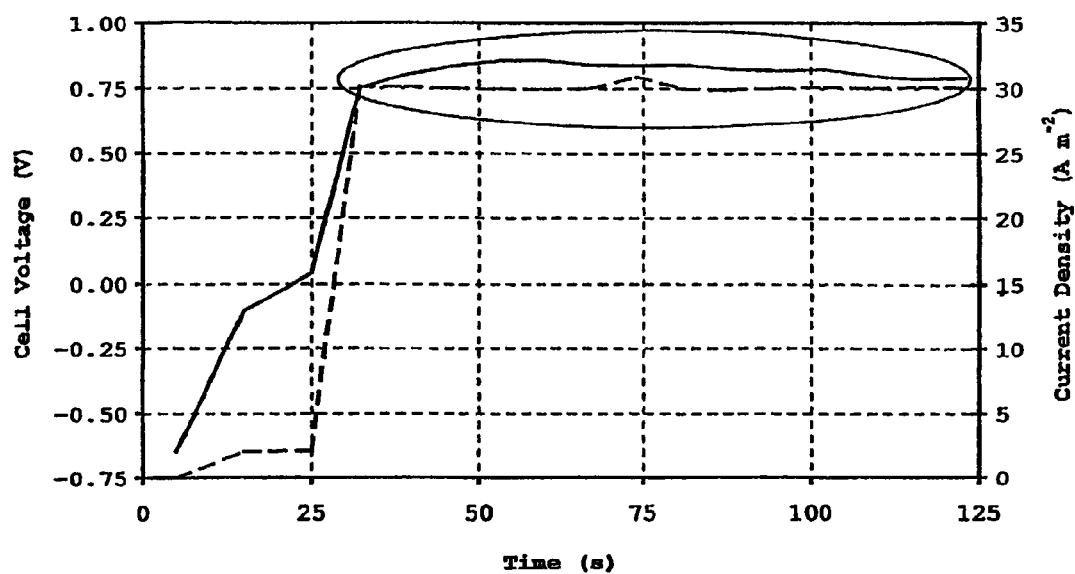
FIG. 7 is a graph showing electrode voltage versus time during XMD deposition.

A typical example of electrode voltage versus time during XMD deposition is shown in FIG. 7. The encircled data in this figure was used to determine the average plating voltage. Tables 2 and 3 contain the maximum and minimum average plating voltage for each XMD sample, and the experimental conditions under which they were achieved. Note that the data in these tables has been arranged from highest to lowest average plating voltage. For the purposes of comparison, Table 4 shows the average plating voltage, at different current densities, in the absence of dopants.

The reason for tabulating the highest and lowest average plating voltage is so that ideal electrolysis cell conditions can be extracted depending on operational requirements. For example, it is possible to envision the situation where the maximum possible XMD output is required from production, at the least possible cost. With these requirements XMD production should be carried out at the highest possible current density so as to produce the most XD. However, under normal circumstances, using a very high deposition current density leads to titanium anode passivation problems as a result of too high an operating cell voltage. To counteract this problem a dopant could be added to the electrolyte that acted to lower the cell voltage. For instance, if Au$^{3+}$ or Au$^+$, or in more practical terms Mg$^{2+}$ ions, were added to the electrolyte then XMD deposition could be carried out at a high current density, but the operating voltage would be lower. Another beneficial consequence of adding such a dopant is that operating at a lower cell voltage reduces power consumption during XMD deposition, resulting in a cost saving. Another consequence is that the XMD plating cycle will be shorter.

It can be seen from Table 2 that the most common plating current density for the maximum plating voltage was 100 A m$^{-2}$. This is consistent with the data in Table 4 for the non-doped samples which show a steady increase in average plating with increasing deposition current density. The data in Table 4 can be used to explain why the minimum average plating voltage most often occurred when 30 A m$^{-2}$ was used.

TABLE 2

Maximum average plating voltage for each dopant series.

| Dopant | Cell Voltage (V) | Current Density (A m$^{-2}$) | [Dopant 1] (ppm) | [Dopant 2] (ppm) |
|---|---|---|---|---|
| Sn | 2.279 | 60 | 1000 | |
| Y | 1.348 | 100 | 25 | |
| Ti | 1.271 | 100 | 1000 | |
| Ce | 1.207 | 100 | 25 | |
| Ni/B | 1.194 | 100 | 50 | 25 |

TABLE 2-continued

Maximum average plating voltage for each dopant series.

| Dopant | Cell Voltage (V) | Current Density (A m$^{-2}$) | [Dopant 1] (ppm) | [Dopant 2] (ppm) |
|---|---|---|---|---|
| Al/Ni | 1.182 | 100 | 25 | 1000 |
| Al/Ta | 1.177 | 100 | 1000 | 100 |
| Zr | 1.165 | 100 | 2000 | |
| Co | 1.164 | 100 | 50 | |
| P | 1.154 | 100 | 1000 | |
| Ag | 1.144 | 40 | 1000 | |
| Si | 1.123 | 100 | 1000 | |
| Ta/B | 1.114 | 100 | 25 | 1000 |
| Rh | 1.108 | 100 | 100 | |
| Sc | 1.106 | 100 | 100 | |
| Al | 1.099 | 100 | 1000 | |
| In | 1.098 | 100 | 50 | |
| Ti/B | 1.095 | 100 | 50 | 1000 |
| Sb | 1.093 | 40 | 1000 | |
| Cr | 1.088 | 100 | 1000 | |
| K | 1.081 | 100 | 1000 | |
| Zn | 1.076 | 100 | 1000 | |
| Fe | 1.069 | 100 | 25 | |
| Cu | 1.069 | 100 | 1000 | |
| Pd | 1.068 | 100 | 50 | |
| Zr/B | 1.063 | 100 | 25 | 25 |
| Ge | 1.059 | 100 | 100 | |
| Hf | 1.054 | 100 | 1000 | |
| Ga | 1.040 | 100 | 50 | |
| B | 1.036 | 100 | 1000 | |
| V | 1.030 | 100 | 25 | |
| Nb/B | 1.028 | 100 | 50 | 1000 |
| Ni | 1.027 | 100 | 100 | |
| Al/Nb | 1.012 | 100 | 50 | 1000 |
| Nb | 1.011 | 100 | 50 | |
| Ta | 1.004 | 100 | 25 | |
| Sr | 0.995 | 100 | 1000 | |
| Ba | 0.959 | 100 | 50 | |
| Ir | 0.949 | 100 | 25 | |
| Os | 0.930 | 100 | 500 | |
| Ru | 0.896 | 100 | 50 | |
| Pt | 0.895 | 100 | 1000 | |
| Mg | 0.852 | 100 | 100 | |
| Au (I) | 0.775 | 100 | 25 | |
| Au (III) | 0.705 | 100 | 25 | |

TABLE 3

Minimum average plating voltage for each dopant series.

| Dopant | Cell Voltage (V) | Current Density (A m$^{-2}$) | [Dopant 1] (ppm) | [Dopant 2] (ppm) |
|---|---|---|---|---|
| Zn | 0.940 | 30 | 25 | |
| Cu | 0.922 | 40 | 50 | |
| Ti | 0.916 | 30 | 25 | |
| Zr | 0.909 | 30 | 25 | |
| K | 0.894 | 30 | 25 | |
| Ga | 0.894 | 30 | 25 | |
| Fe | 0.889 | 30 | 1000 | |
| Ge | 0.884 | 30 | 1000 | |
| Hf | 0.881 | 30 | 25 | |
| V | 0.871 | 40 | 12 | |
| Al | 0.871 | 30 | 25 | |
| Si | 0.855 | 30 | 25 | |
| P | 0.854 | 30 | 25 | |
| B | 0.852 | 30 | 25 | |
| Ta | 0.832 | 30 | 25 | |
| In | 0.827 | 30 | 25 | |
| Cr | 0.824 | 30 | 25 | |
| Sc | 0.823 | 30 | 25 | |
| Ni | 0.821 | 30 | 25 | |
| Ag | 0.817 | 30 | 25 | |
| Rh | 0.809 | 30 | 25 | |
| Zr/B | 0.804 | 30 | 25 | 50 |
| Pt | 0.792 | 30 | 100 | |
| Ru | 0.788 | 30 | 1000 | |
| Mg | 0.778 | 30 | 25 | |
| Os | 0.763 | 30 | 25 | |
| Al/Ni | 0.763 | 30 | 100 | 25 |
| Sn | 0.752 | 30 | 50 | |
| Ta/B | 0.749 | 30 | 100 | 25 |
| Co | 0.736 | 30 | 50 | |
| Al/Ta | 0.732 | 30 | 50 | 25 |
| Nb/B | 0.712 | 40 | 25 | 25 |
| Ni/B | 0.709 | 30 | 100 | 100 |
| Y | 0.705 | 30 | 25 | |
| Nb | 0.692 | 30 | 25 | |
| Ce | 0.689 | 40 | 100 | |
| Pd | 0.672 | 100 | 100 | |
| Al/Nb | 0.670 | 30 | 25 | 25 |
| Sr | 0.667 | 30 | 25 | |
| Ir | 0.579 | 100 | 100 | |
| Sb | 0.549 | 60 | 100 | |
| Ti/B | 0.523 | 40 | 100 | 50 |
| Ba | 0.494 | 30 | 25 | |
| Au (I) | 0.440 | 30 | 1000 | |
| Au (III) | 0.023 | 30 | 1000 | |

TABLE 4

Average plating voltage in the absence of dopants.

| Current Density (A m$^{-2}$) | Cell Voltage (V) |
|---|---|
| 30 | 0.860 |
| 40 | 0.897 |
| 60 | 0.920 |
| 100 | 0.952 |

Open Circuit Voltage

Figure 8:
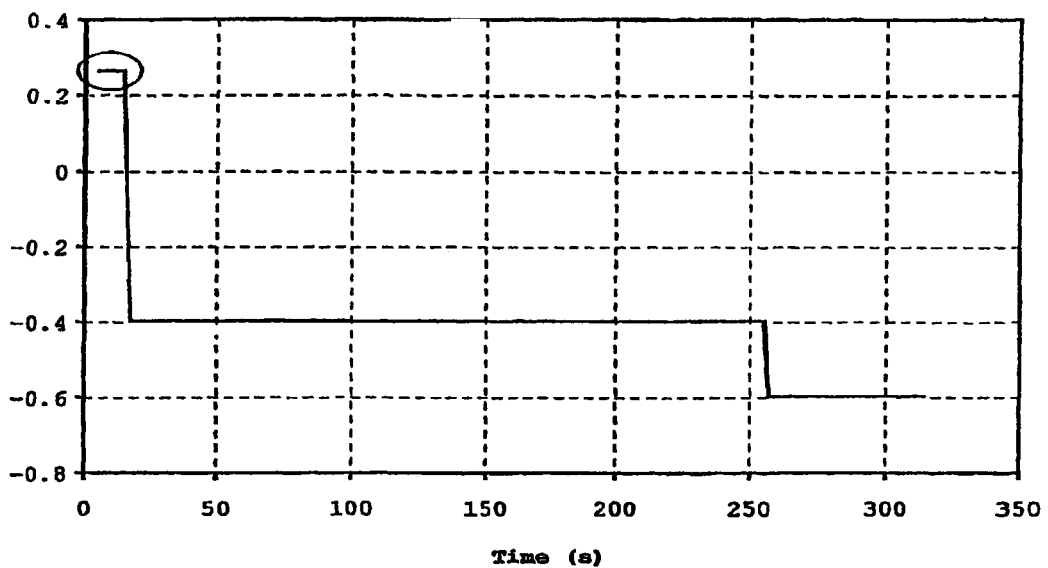
FIG. 8 is a graph showing the discharge profile applied to an XMD electrode.
Figure 9:
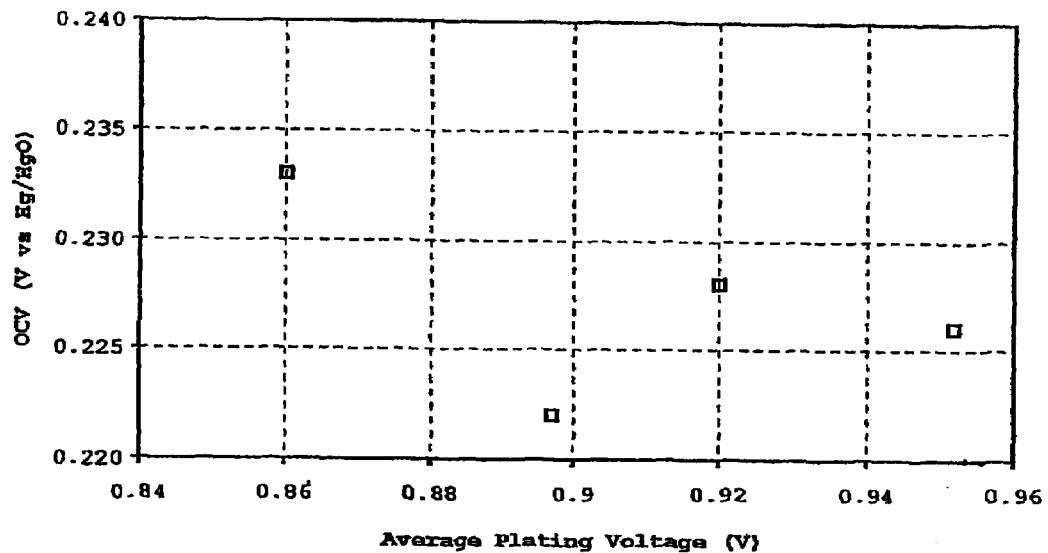
FIG. 9 is a graph showing the relationship between average plating voltage and open circuit voltage for non-doped EMD samples.

This was the first discharge property of each EMD electrode that was recorded. An example of the discharge profile applied to an EMD electrode is shown in FIG. 8. The encircled area in this figure represents the EMD open circuit voltage.

TABLE 5

Maximum open circuit voltage for each dopant series.

| Dopant | OCV (V vs Hg/HgO) | Current Density (A m$^{-2}$) | [Dopant 1] (ppm) | [Dopant 2] (ppm) |
|---|---|---|---|---|
| Pd | 0.350 | 100 | 50 | |
| Ni/B | 0.344 | 30 | 50 | 1000 |
| Zr/B | 0.328 | 60 | 50 | 100 |
| Ga | 0.323 | 100 | 25 | |
| Si | 0.321 | 30 | 1000 | |
| Al/Ni | 0.314 | 100 | 1000 | 25 |
| Ta/B | 0.310 | 40 | 50 | 50 |
| In | 0.302 | 100 | 100 | |
| Sn | 0.301 | 100 | 25 | |
| Mg | 0.301 | 100 | 1000 | |
| B | 0.301 | 30 | 50 | |
| Ge | 0.293 | 30 | 1000 | |
| Ti/B | 0.292 | 40 | 1000 | 50 |
| Al/Nb | 0.292 | 60 | 100 | 1000 |
| Al/Ta | 0.291 | 100 | 1000 | 1000 |
| Nb/B | 0.291 | 100 | 1000 | 100 |
| Cr | 0.290 | 60 | 1000 | |
| Co | 0.287 | 40 | 100 | |
| Zr | 0.287 | 60 | 25 | |

TABLE 5-continued

Maximum open circuit voltage for each dopant series.

| Dopant | OCV (V vs Hg/HgO) | Current Density (A m$^{-2}$) | [Dopant 1] (ppm) | [Dopant 2] (ppm) |
|---|---|---|---|---|
| Ir | 0.284 | 30 | 25 | |
| Sr | 0.284 | 60 | 50 | |
| Sb | 0.283 | 100 | 1000 | |
| Ba | 0.281 | 30 | 50 | |
| Rh | 0.279 | 100 | 100 | |
| Ru | 0.279 | 100 | 100 | |
| Ti | 0.275 | 80 | 25 | |
| Au (I) | 0.274 | 60 | 1000 | |
| Zn | 0.270 | 40 | 100 | |
| Al | 0.269 | 30 | 100 | |
| Ni | 0.268 | 60 | 25 | |
| Au (III) | 0.266 | 30 | 50 | |
| Cu | 0.263 | 40 | 25 | |
| Ag | 0.262 | 100 | 1000 | |
| Ta | 0.261 | 40 | 1000 | |
| Sc | 0.256 | 30 | 1000 | |
| Ce | 0.255 | 40 | 100 | |
| P | 0.248 | 30 | 25 | |
| Fe | 0.247 | 80 | 25 | |
| Nb | 0.247 | 30 | 100 | |
| K | 0.244 | 30 | 50 | |
| Hf | 0.239 | 100 | 100 | |
| Os | 0.225 | 30 | 500 | |
| V | 0.203 | 60 | 500 | |
| Pt | 0.127 | 60 | 25 | |
| Y | 0.052 | 100 | 25 | |

The maximum open circuit voltage for each dopant series is shown in Table 5. Also shown in this table are the deposition conditions used to generate these samples. Table 6 shows the open circuit voltage for the non-doped EMD samples.

TABLE 6

Open circuit voltage for the non-doped EMD samples.

| Current Density (A m$^{-2}$) | OCV (V vs Hg/HgO) |
|---|---|
| 30 | 0.233 |
| 40 | 0.222 |
| 60 | 0.228 |
| 100 | 0.226 |

The data in Table 6 suggest that as the deposition current density is increased the EMD open circuit voltage decreases. This data is of course only for an non-doped EMD sample. Examining all of the data for such a trend reveals that the open circuit voltage of the XMD is a complex interaction between both the current density and dopant concentration.

Capacity Utilization

Figure 10:
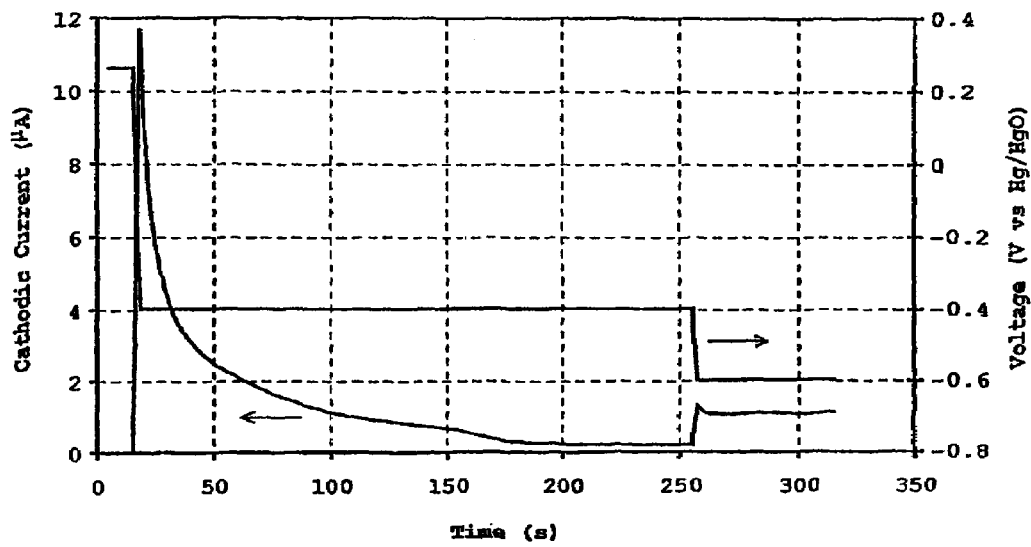
FIG. 10 is a graph showing the current response of an EMD electrode during discharge.

The capacity utilization relates the capacity realized during discharge to the total capacity available. To determine the capacity realized during discharge we must carry out a numerical integration of the current versus time data. As an example, FIG. 10 shows the current response during discharge. The area bounded by the curve and the X axis, ranging from initiation of the voltage step to a time 180 s after the voltage step, was determined using Simpson's rule; i.e., $$Q = \sum_{j=0}^{180} \left( \frac{[I_j(t_j - t_{j+1})] + [I_{j+1}(t_j - t_{j+1})]}{2} \right) \quad (13)$$

where I is the current and t is the time. Once the discharge capacity had been determined, Eqn (10) was used to determine the capacity utilization. Table 7 shows the maximum capacity utilization for each dopant series, and the deposition conditions under which that XMD sample was formed. For the purposes of comparison, Table 8 contains capacity utilization data for the non-doped EMD samples. Table 9 shows the performance improvement generated as a result of doping. Two methods of comparison were used. The first compares the capacity utilization of the doped EMD (Table 7) with an non-doped EMD made under the same conditions; i.e., a direct performance comparison. The second method compares the XMD with the capacity utilization of the best non-doped EMD. The data presented in Tables 7 and 9 may be used just to identify those dopants that enhance XMD performance.

The data in Table 9 show that there were a number of dopants that significantly improved XMD capacity utilization.

TABLE 7

Maximum capacity utilization for each dopant series.

| Dopant | Utilization (%) | Current Density (A m$^{-2}$) | [Dopant 1] (ppm) | [Dopant 2] (ppm) |
|---|---|---|---|---|
| Au (III) | 47.25 | 30 | 1000 | |
| Pt | 33.00 | 30 | 1000 | |
| Au (I) | 32.02 | 30 | 25 | |
| Zr | 32.00 | 30 | 2000 | |
| Al/Nb | 31.69 | 30 | 100 | 50 |
| Ce | 29.80 | 30 | 25 | |
| Hf | 29.19 | 60 | 50 | |
| Al | 28.42 | 30 | 1000 | |
| Zr/B | 28.06 | 100 | 25 | 100 |
| Ga | 26.18 | 30 | 1000 | |
| Al/Ni | 25.96 | 30 | 50 | 100 |
| B | 25.93 | 40 | 1000 | |
| Ni | 25.38 | 30 | 1000 | |
| Zn | 24.72 | 40 | 1000 | |
| Nb/B | 24.47 | 30 | 50 | 100 |
| Si | 24.04 | 30 | 1000 | |
| Ge | 21.95 | 40 | 100 | |
| Ti | 21.49 | 30 | 1000 | |
| Rh | 21.45 | 30 | 1000 | |
| Cr | 21.43 | 40 | 25 | |
| Sb | 21.04 | 40 | 1000 | |
| In | 19.89 | 30 | 1000 | |
| K | 19.37 | 40 | 1000 | |
| Ru | 18.80 | 30 | 25 | |
| Cu | 18.33 | 30 | 100 | |
| P | 17.72 | 30 | 25 | |
| Ta/B | 17.72 | 30 | 25 | 50 |
| Sr | 17.16 | 40 | 1000 | |
| Nb | 16.96 | 30 | 100 | |
| Ni/B | 16.79 | 30 | 100 | 25 |
| Pd | 16.46 | 30 | 1000 | |
| Ag | 16.41 | 30 | 1000 | |
| Mg | 16.34 | 30 | 50 | |
| V | 15.81 | 30 | 25 | |
| Ti/B | 15.08 | 30 | 25 | 50 |
| Co | 13.97 | 30 | 50 | |
| Ba | 13.81 | 30 | 1000 | |
| Al/Ta | 12.95 | 40 | 25 | 25 |
| Fe | 11.91 | 30 | 25 | |
| Sn | 11.53 | 40 | 25 | |
| Ta | 10.83 | 30 | 25 | |
| Os | 8.92 | 30 | 500 | |
| Sc | 8.06 | 30 | 25 | |
| Ir | 7.43 | 100 | 25 | |
| Y | 0.81 | 100 | 100 | |

TABLE 8

Capacity utilization for the non-doped EMD samples.

| Current Density (A m$^{-2}$) | Utilization (%) |
|---|---|
| 30 | 15.19464 |
| 40 | 16.44106 |
| 60 | 12.94906 |
| 100 | 8.758368 |

We can speculate that relatively small changes in electrode properties lead to big differences in electrode performance. Having established that reliable data could be obtained using the combinatorial method we assume that the observed performance differences were due to the effects of the dopant.

Additional capacity utilization data for binary and ternary systems are shown in Table 9.

TABLE 9

BINARY DOPANTS

| Dopant | [] (ppm) | Dopant | [] (ppm) | Current (A m-2) | Capacity Utilization Control | Sample | % Imp. |
|---|---|---|---|---|---|---|---|
| Hf | 50 | Zr | 50 | 60 | 50.8 | 89.6 | 76.4 |
| Zn | 1000 | Ni | 1000 | 30 | 49.3 | 83.5 | 69.4 |
| Zn | 1000 | Zr | 50 | 60 | 54.5 | 90.4 | 65.9 |
| Cr | 50 | Al | 50 | 30 | 28.7 | 45 | 56.8 |
| Cr | 1000 | Ni | 50 | 30 | 20.6 | 30.3 | 47.1 |
| Cu | 1000 | Zr | 1000 | 60 | 36.4 | 53.5 | 47.0 |
| Al | 1000 | Zn | 50 | 30 | 49.5 | 67.8 | 37.0 |
| Zn | 50 | Hf | 1000 | 30 | 43.2 | 58.7 | 35.9 |
| Zn | 1000 | Ag | 50 | 60 | 24.7 | 33.4 | 35.2 |
| Ag | 1000 | Ni | 50 | 30 | 33.4 | 45.1 | 35.0 |
| Zn | 1000 | B | 1000 | 30 | 47.8 | 64.1 | 34.1 |
| Ce | 1000 | Ni | 1000 | 30 | 47.5 | 61.6 | 29.7 |
| Zr | 1000 | Ce | 50 | 30 | 37.8 | 47.7 | 26.2 |
| Hf | 50 | B | 1000 | 30 | 35.6 | 44.3 | 24.4 |
| Ce | 1000 | Ga | 50 | 30 | 49.5 | 60.6 | 22.4 |
| Cu | 1000 | Cr | 50 | 30 | 40.7 | 48.6 | 19.4 |
| Ce | 1000 | B | 50 | 30 | 42.4 | 49.8 | 17.5 |
| Cu | 50 | Hf | 1000 | 30 | 50.7 | 58.7 | 15.8 |
| Zr | 50 | Ga | 1000 | 30 | 44.4 | 50 | 12.6 |
| Ti | 50 | Hf | 50 | 30 | 47.8 | 53.7 | 12.3 |
| Zr | 1000 | Al | 50 | 30 | 36.8 | 40.5 | 10.1 |
| Ce | 50 | Hf | 1000 | 30 | 38.4 | 41.8 | 8.9 |
| Ga | 50 | B | 1000 | 30 | 38.4 | 41.8 | 8.9 |
| Ga | 50 | Ni | 1000 | 30 | 45.6 | 49.4 | 8.3 |
| Sr | 1000 | Zr | 1000 | 30 | 46.7 | 50 | 7.1 |
| Ti | 50 | Ni | 50 | 30 | 53.2 | 56.5 | 6.2 |
| Hf | 50 | Ni | 50 | 30 | 56.1 | 58.3 | 3.9 |
| Cr | 50 | Zr | 1000 | 30 | 29.5 | 30.6 | 3.7 |
| Ru | 1000 | Al | 1000 | 30 | 49.2 | 50.9 | 3.5 |
| Ga | 50 | Ag | 1000 | 30 | 48.4 | 49.9 | 3.1 |
| Ce | 50 | Al | 50 | 60 | 54.3 | 55.5 | 2.2 |
| Hf | 50 | Ag | 1000 | 60 | 32.5 | 33.2 | 2.2 |
| Zr | 50 | In | 1000 | 60 | 40.4 | 41.2 | 2.0 |
| Ti | 50 | Ce | 1000 | 30 | 49.5 | 50.4 | 1.8 |
| Sr | 50 | Hf | 50 | 30 | 50.4 | 51.1 | 1.4 |
| Cr | 50 | Ga | 50 | 30 | 39.4 | 39.8 | 1.0 |
| Cr | 50 | Hf | 50 | 30 | 40.6 | 41 | 1.0 |

TERNARY DOPANTS

| Dopant | [] (ppm) | Dopant | [] (ppm) | Dopant | [] (ppm) | Current (A m-2) | Capacity Utilization Control | Sample | % Imp. |
|---|---|---|---|---|---|---|---|---|---|
| Zr | 50 | Hf | 50 | Ni | 1000 | 30 | 50.2 | 58.4 | 16.3 |
| Al | 1000 | Ni | 1000 | Zr | 1000 | 30 | 48 | 53 | 10.4 |
| Zr | 50 | Hf | 50 | Zn | 1000 | 30 | 51.1 | 53.1 | 3.9 |
| Zr | 1000 | Ce | 50 | Ni | 50 | 60 | 50 | 51.2 | 2.4 |

Second Electron Capacity

Characterization of the second electron capacity during the second voltage step is important because of the potential a dopant may have to dramatically enhance the performance of this step and hence open up a new avenue for service improvements. To extract this information from the available data we can make use of Eqn (12) which relates the capacity realized during the second voltage step to the total capacity realized during both voltage steps. Table 14 shows the maximum value for each dopant series and the conditions under which the sample was made. The main focus has been on the first electron discharge, i.e., the first voltage step from the open circuit voltage to −0.4 V, and so in some cases data for the second step was unavailable. Therefore, as can been seen from Table 10, not all of the samples examined are included. Nevertheless, the data in this table can be used to give us an idea about the efficiency of the second electron reduction step.

For the purposes of comparison, Table 11 contains data showing the proportion of total capacity realized during the second voltage step for the non-doped EMD samples. This data shows a decrease in the relative second electron capacity as the

TABLE 10

Proportion of the total capacity realized during the second voltage step.

| Dopant | Proportion (%) | Current Density (A m$^{-2}$) | [Dopant 1] (ppm) | [Dopant 2] (ppm) |
|---|---|---|---|---|
| Al/Nb | 94.11 | 100 | 50 | 100 |
| Sn | 79.46 | 40 | 1000 | |
| Ti/Zr | 76.75 | 60 | 50 | 25 |
| Ta | 72.85 | 60 | 50 | |
| Ni/Al | 69.39 | 100 | 50 | 100 |
| P | 63.08 | 100 | 100 | |
| Os | 56.77 | 100 | 100 | |
| Rh | 54.47 | 40 | 25 | |
| K | 50.05 | 30 | 1000 | |
| Nb | 48.86 | 40 | 1000 | |
| Ni | 47.69 | 100 | 50 | |
| Au (I) | 43.95 | 60 | 25 | |
| Ru | 43.65 | 100 | 25 | |
| Al/Ta | 43.42 | 100 | 25 | 50 |
| Ti/B | 38.9 | 100 | 50 | 50 |
| Nb/Zr | 33.48 | 100 | 25 | 25 |
| Zr | 32.23 | 30 | 100 | |
| Au (III) | 30.98 | 60 | 1000 | |
| Hf | 29.81 | 100 | 25 | |
| Pt | 28.09 | 100 | 25 | |
| Al | 26.77 | 100 | 25 | |
| Ni/B | 23.64 | 100 | 25 | 25 |
| Nb/B | 22.71 | 40 | 25 | 50 |
| Sb | 20.96 | 60 | 25 | |
| Zn | 20.19 | 40 | 50 | |
| B | 18.18 | 40 | 50 | |
| Ge | 15.31 | 40 | 1000 | |
| Ta/B | 14.09 | 100 | 25 | 50 |
| Cu | 13.34 | 40 | 100 | |

TABLE 11

Proportion of the total capacity realized during the second voltage step for the non-doped EMD electrodes.

| Current Density (A m$^{-2}$) | Proportion (%) |
|---|---|
| 30 | 31.03 |
| 40 | 29.84 |
| 60 | 23.37 |
| 100 | 22.77 |

TABLE 12

Performance improvement during the second electron discharge.

| | | Performance Improvement | |
|---|---|---|---|
| Dopant | Proportion (%) | Versus Same (%) | Versus Best (%) |
| Al/Nb | 94.11 | 313.3 | 229.9 |
| Sn | 79.46 | 166.3 | 159.9 |
| Ti/Zr | 76.75 | 228.4 | 172.0 |
| Ta | 72.85 | 211.7 | 159.5 |
| Ni/Al | 69.39 | 204.7 | 150.2 |
| P | 63.08 | 177.0 | 129.9 |
| Os | 56.77 | 149.3 | 109.6 |
| Rh | 54.47 | 82.5 | 79.4 |
| K | 50.05 | 61.3 | 61.3 |
| Nb | 48.86 | 63.7 | 61.3 |
| Ni | 47.69 | 109.4 | 80.3 |
| Au (I) | 43.95 | 88.1 | 66.3 |
| Ru | 43.68 | 91.8 | 67.4 |
| Al/Ta | 43.42 | 90.7 | 66.5 |
| Ti/B | 38.9 | 70.8 | 52.0 |
| Nb/Zr | 33.48 | 47.0 | 34.5 |
| Zr | 32.23 | 3.9 | 3.9 |
| Au (III) | 30.98 | 32.6 | 24.5 |
| Hf | 29.81 | 30.9 | 22.7 |
| Pt | 28.09 | 23.4 | 17.1 |
| Al | 26.77 | 17.6 | 12.9 |
| Ni/B | 23.64 | 3.8 | 2.8 |
| Nb/B | 22.71 | −23.9 | −23.0 |
| Sb | 20.96 | −10.3 | −7.8 |
| Zn | 20.19 | −32.3 | −31.1 |
| B | 18.18 | −39.1 | −37.6 |
| Ge | 15.31 | −48.7 | −46.8 |
| Ta/B | 14.09 | −38.1 | −28.0 |
| Cu | 13.34 | −55.3 | −53.2 | deposition current density was increased. The data in Table 11 was used to determine the changes in second electron discharge performance that result from doping. Table 12 shows the relative performance improvement during the second electron discharge. The data shown in this table are with respect to an non-doped EMD made under the same discharge conditions, and also with respect to the EMD that had the best second electron discharge performance.

The second electron discharge of manganese dioxide (EMD in particular) is very dependent on the morphology of the material under study. The second electron discharge itself is a dissolution-precipitation type of process that is very dependent on the crystallite size (surface area to volume ratio) of the material under study. Some of the single dopants that enhanced the second electron capacity did not have very good performance during the first discharge step; e.g., Ta, P and Os. It is believed that this is due to morphological changes in these samples with the inclusion of these dopants. The binary dopants that were examined seemed to exhibit good performance during both steps in the discharge; e.g., Al/Ni and Al/Nb. This could also be due to morphological changes induced by the inclusion of dopants; i.e., these dopants alter the manganese dioxide structure, and hence morphology, as a result of differences in their size, charge.

Electrochemical characterization of each XMD electrode was carried out in 9 M KOH using double step chronoamperometry; i.e., a voltage step from the open circuit voltage to −0.4 V, where it was held for 240 s, followed immediately by a voltage step from −0.4 V to −0.6 V, where it was held for 60 s. From these experiments the open circuit voltage, diffusivity and capacity utilization during both the first and second voltage steps was determined for each dopant series.

The average plating voltage data measured during deposition of each doped EMD series can be used to reduce the cost of XMD deposition, or to speed up the XMD plating cycle. As a cost-cutting method, including a dopant (e.g., $Mg^{2+}$) in the electrolyte can lower the average plating voltage, compared to a control EMD, for a fixed deposition current density. Under these circumstances the power consumption would be less, thus reducing the cost of XMD production. Alternatively, the deposition current density in the doped cell could be raised so that the average plating voltage was equivalent to that in the control cell. Under these circumstances more XMD could be produced in the same amount of time, thus decreasing the length of the XMD plating cycle.

The open circuit voltage of each XMD sample, measured prior to the chronoamperometric discharge, gives us an indication of the effect that the dopant has on the XMD potential. Dopants have the effect of altering the structural energy and hence the open circuit voltage. It is important to note that XMD samples with too high an open circuit voltage may disproportionate in concentrated alkaline electrolytes, leading to the formation of soluble Mn(V) and solid Mn(III) species which will affect the overall performance of the Zn—$MnO_2$ cell. On the other hand, too low an open circuit voltage is typically an indication of a partially reduced EMD with less available capacity for discharge. XMD samples were prepared that had very high open circuit voltage; e.g., Pd-doped +0.350 V and Ni/B-doped +0.344 V, which are both ~0.12 V larger then the control EMD samples.

The final data characterization method was the capacity extracted during the second voltage step compared to the total discharge capacity extracted from the electrode. This information is related to the ability of the dopant to enhance the capacity of the second electron discharge. It was noted that those single dopants (e.g., P, Ta and Os) that did not perform well during the first voltage step performed very well during the second voltage step. Also some of the binary dopants (e.g., Al/Ni and Al/Nb) performed well during the second voltage step.

Using the capacity utilization and other data a series of dopants were selected for further study. The selected dopants are as follows: Au(III), Pt, Zr, Ce, Hf, Al, Ga, B, Ni, Zn, Ru, Sb, Rh, P, Sr, Si, Ti, Os, Cr, Cu and In.

The next step was analysis of larger quantities of these materials using traditional physical and electrochemical characterization methods. Also included in the next steps is a more thorough analysis of the dopant inclusion process. Such issues as level of incorporation and dopant location were considered.

Example 6

The following standard method was used for the electrochemical characterization of cathode materials.

Cell Components

Electrochemical cells for half-cell testing were prepared form the following components:
Manganese dioxide
Conductor (typically KS6 graphite)
Electrolyte (typically 9.0 M KOH)
Stainless steel current collector with attached contact tab
Cell body (see FIG. 11)
Separator paper disks (3 per cell)
Perforated disk
Cell piston (see FIG. 11)
Counter electrode (Pt wire)
Reference electrode (Hg/HgO in the electrolyte being used)

Blackmix Preparation

The procedure for preparing electrochemical cells for half-cell testing involves molding a manganese dioxide electrode from a blackmix consisting of manganese dioxide, electronic conductor and electrolyte. Blackmix preparation is an important part of the procedure, since adequate mixing of the components is desired to obtain accurate and precise data.

For testing the intrinsic capacity of manganese dioxide samples a blackmix containing 45% manganese dioxide, 45% graphite (Timcal KS6 is preferable) and 10% electrolyte (typically 9.0 M KOH) was used. The amount of each component was selected so that the blackmix consists of 2.000 g of manganese dioxide. This was achieved by weighing out 2.000 g of manganese dioxide (doped or not doped) and carefully transferring it to a mortar. An appropriate amount of conductor (graphite) was then tranferred to the same mortar. The two dry components were then ground using the mortar and pestle until they were thoroughly mixed. An appropriate amount of electrolyte was then transferred to the mortar. Grinding was continued until a homogeneous paste was formed. Throughout the mixing process any lumps were broken up using a spatula. The blackmix was then transferred to an air-tight container and allow it to equilibrate for at least 12 hours before use.

Cell Assembly

Figure 11:
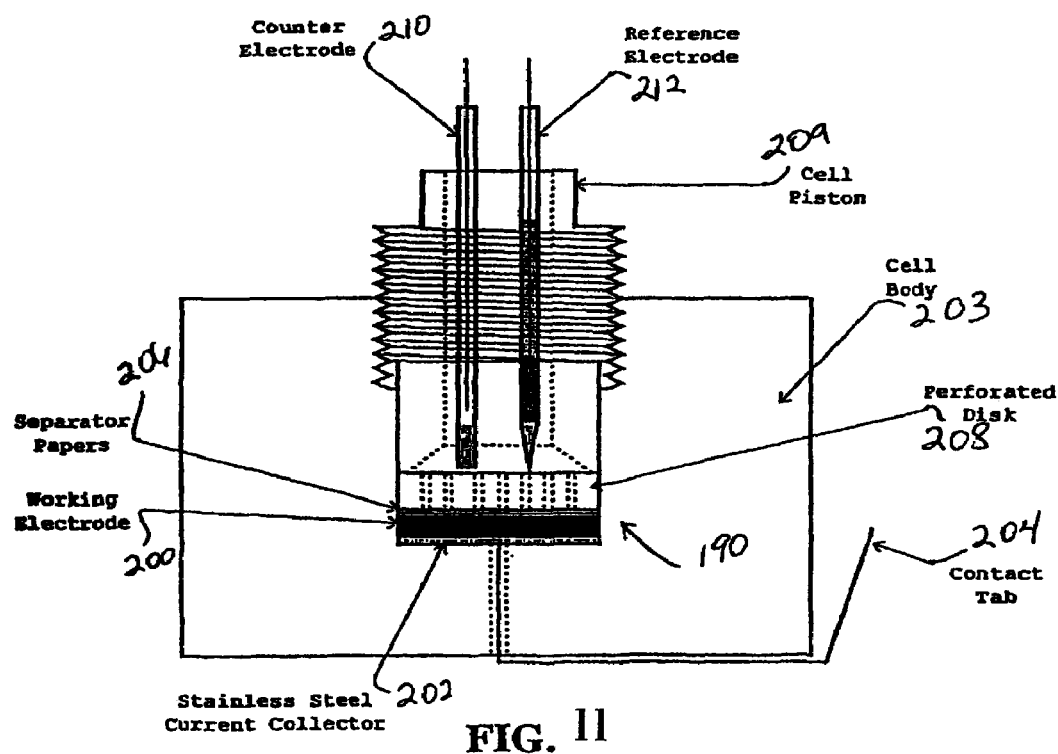
FIG. 11 is a schematic diagram of an electrochemical cell assembly for characterizing properties of an electrode comprising the XMD of this invention.

A schematic diagram of an assembled test cell is shown in FIG. 11. All cell components are cleaned and dried. The surfaces of the stainless steel current collector 202 intended to be in contact with the manganese dioxide electrode were polished with fine emery paper. From the top of cell 190, a contact tab 204, electrically connected to the stainless steel current collector 202, was fed through a hole in the bottom of cell body 203. Current collector 202 was pressed down so that it layed flat against the base of the cavity (electrode cavity). Contact tab 204 was then bent so that it layed flat against the base of cell 190 and so that cell 190 could be placed upright on a bench top. An amount of blackmix corresponding to 0.200 g of manganese dioxide was transferred to the electrode cavity, on top of stainless steel current collector 202. The blackmix was spread evenly over current collector 202 using a spatula. Any residual blackmix particles on the walls of the cell body were brushed down into the electrode cavity. The blackmix in the electrode cavity was covered with three disks of separator paper 206 (one at a time) to ensure that no blackmix escaped from below the bottom paper. Perforated disk 208 was placed on top of the separator papers. A compression piston 209 was then inserted into the cell, on top of the perforated disk. The blackmix was compressed under 1000 kg for at least one minute using a hydraulic press (not shown). The pressure was continuously monitored and adjusted because the blackmix/electrode tends to relax with time. Once the blackmix had been compressed to form an electrode 200, the hydraulic press and compression piston were removed from cell 190, and cell piston 209 was tightened onto the cell using a torque wrench (30 cm kg). About 8 mL of electrolyte was added to the cell. The counter electrode 210 and reference electrode 212 were then inserted into the cell 190 through a hole in the top of the cell piston 209, so that both electrodes 210 and 212 were immersed in electrolyte and positioned on top of perforated disk 208. The leads from a potentiostat or power supply were connected to the appropriate points on the cell; i.e., counter to counter, reference to reference and working electrode to the contact tab attached to the stainless steel current collector. The cell was allowed to equilibrate for about 30 minutes before starting the discharge experiment.

The test cell 190 described above is well suited for the study of intrinsic manganese dioxide electrochemical properties using voltammetric or galvanostatic discharge. It can be used to examine the electrochemical behaviour of the manganese dioxide itself, not the cathode as a whole. With excess conductor and electrolyte there should be no mass transport problems associated with poor electrode electronic conductivity or electrolyte availability.

As with any characterization tool, reproducibility is an important issue. Three electrodes were prepared from each blackmix and tested under the same discharge conditions. The results show very good reproducibility.

Example 7

The results from discharge testing are set forth below in Table 13.

TABLE 13

XMD Performance at Different Voltage Cutoff Values

| Dopant | Sample | $H_2SO_4$ (gL$^{-1}$) | $Mn^{2+}$ (gL$^{-1}$) | I (Am$^{-2}$) | T (° C.) | Dopant Bath (ppm) | Dopant Solid (ppm) | Performance (Cg$^{-1}$) | Performance (%) |
|---|---|---|---|---|---|---|---|---|---|
| XRD Performance to a +1.0 V Cutoff | | | | | | | | | |
| Ti | E98-11-A | 35 | 55 | 65 | 97 | 1000 | 5900 | 71.6 | 118.2 |
|  | E98-11-B | 35 | 55 | 65 | 97 | 2500 |  | 90.3 | 149.0 |
|  | E98-11-C | 35 | 55 | 65 | 97 | 5000 |  | 94.6 | 156.1 |
|  | E98-11-D | 35 | 55 | 65 | 97 | 10000 |  | 68.3 | 112.7 |
| Ni | E01-11 | 35 | 55 | 65 | 97 | 1000 | 104 | 66.6 | 109.9 |
|  | E01-12-A | 35 | 55 | 65 | 93 | 400 | 40 | 68.8 | 113.5 |
|  | E01-12-B | 35 | 55 | 65 | 99 | 400 | 47 | 67.9 | 112.0 |
|  | E01-13-B | 35 | 55 | 45 | 97 | 1000 | 158 | 78.7 | 129.9 |
|  | E01-13-C | 35 | 55 | 85 | 97 | 400 | 38 | 68.7 | 113.4 |
|  | E01-13-D | 35 | 55 | 85 | 97 | 1000 | 124 | 77.8 | 128.4 |
|  | E01-14-C | 45 | 55 | 65 | 97 | 400 |  | 77.3 | 127.6 |
|  | E01-14-D | 45 | 55 | 65 | 97 | 1000 |  | 82.6 | 136.3 |
| B | E00-32-B | 35 | 55 | 50 | 97 | 1000 | 59 | 70.5 | 116.3 |
|  | E00-32-C | 35 | 55 | 65 | 97 | 1000 | 59 | 72.6 | 119.8 |
| Zn | E01-15-A | 35 | 55 | 65 | 93 | 400 |  | 76.1 | 125.6 |
|  | E01-15-B | 35 | 55 | 65 | 93 | 1000 |  | 68.5 | 113.0 |
|  | E01-16-C | 35 | 55 | 85 | 97 | 400 |  | 67.0 | 110.6 |
|  | E01-16-D | 35 | 55 | 85 | 97 | 1000 |  | 70.9 | 117.0 |
| XRD Performance to a 0.0 V Cutoff | | | | | | | | | |
| Ti | E98-11-A | 35 | 55 | 65 | 97 | 1000 | 5900 | 238.1 | 107.3 |
|  | E98-11-B | 35 | 55 | 65 | 97 | 2500 |  | 265.7 | 119.8 |
|  | E98-11-C | 35 | 55 | 65 | 97 | 5000 |  | 255.7 | 115.3 |
| Ni | E00-57-A | 35 | 55 | 65 | 97 | 100 | 10 | 222.7 | 100.4 |
|  | E00-57-C | 35 | 55 | 65 | 97 | 500 | 44 | 227.1 | 102.4 |
|  | E00-57-D | 35 | 55 | 65 | 97 | 1000 | 76 | 224.6 | 101.3 |
|  | E01-11 | 35 | 55 | 65 | 97 | 1000 | 104 | 232.5 | 104.8 |
|  | E01-12-A | 35 | 55 | 65 | 93 | 400 | 40 | 242.2 | 109.2 |
|  | E01-12-B | 35 | 55 | 65 | 99 | 400 | 47 | 243.1 | 109.6 |
|  | E01-13-B | 35 | 55 | 45 | 97 | 1000 | 158 | 250.2 | 112.8 |
|  | E01-13-C | 35 | 55 | 85 | 97 | 400 | 38 | 238.0 | 107.3 |
|  | E01-13-D | 35 | 55 | 85 | 97 | 1000 | 124 | 251.7 | 113.5 |
|  | E01-14-C | 45 | 55 | 65 | 97 | 400 |  | 256.6 | 115.7 |
|  | E01-14-D | 45 | 55 | 65 | 97 | 1000 |  | 265.4 | 119.7 |
| B | E00-32-B | 35 | 55 | 50 | 97 | 1000 |  | 237.8 | 107.2 |
|  | E00-32-C | 35 | 55 | 65 | 97 | 1000 |  | 238.6 | 107.6 |
| Al | E00-21-D | 35 | 55 | 30 | 97 | 1000 | 260 | 223.7 | 100.9 |
| Zn | E01-15-A | 35 | 55 | 65 | 93 | 400 |  | 261.8 | 118.0 |
|  | E01-15-B | 35 | 55 | 65 | 93 | 1000 |  | 248.5 | 112.0 |
|  | E01-15-D | 35 | 55 | 65 | 99 | 1000 |  | 228.4 | 103.0 |
|  | E01-16-C | 35 | 55 | 85 | 97 | 400 |  | 228.0 | 102.8 |
|  | E01-16-D | 35 | 55 | 85 | 97 | 1000 |  | 239.3 | 107.9 |
| XRD Performance to a −0.1 V Cutoff | | | | | | | | | |
| Mg | E99-35-C | 35 | 55 | 65 | 97 | 1000 |  | 596.0 | 100.4 |
| Ni | E00-57-A | 35 | 55 | 65 | 97 | 100 | 10 | 593.8 | 100.1 |
|  | E00-57-C | 35 | 55 | 65 | 97 | 500 | 44 | 605.8 | 102.1 |
|  | E00-57-D | 35 | 55 | 65 | 97 | 1000 | 76 | 604.0 | 101.8 |
|  | E00-62-A | 35 | 55 | 65 | 97 | 600 | 2 | 595.2 | 100.3 |
|  | E00-62-B | 35 | 55 | 65 | 97 | 700 | 72 | 599.2 | 101.0 |
|  | E01-11 | 35 | 55 | 65 | 97 | 1000 | 104 | 621.5 | 104.7 |
|  | E01-13-A | 35 | 55 | 45 | 97 | 400 | 44 | 595.6 | 100.4 |
|  | E01-12-A | 35 | 55 | 65 | 93 | 400 | 40 | 601.4 | 101.3 |
|  | E01-12-B | 35 | 55 | 65 | 99 | 400 | 47 | 604.6 | 101.9 |

TABLE 13-continued

XMD Performance at Different Voltage Cutoff Values

| Dopant | Sample | $H_2SO_4$ (gL$^{-1}$) | $Mn^{2+}$ (gL$^{-1}$) | I (Am$^{-2}$) | T (° C.) | Dopant Bath (ppm) | Dopant Solid (ppm) | Performance (Cg$^{-1}$) | Performance (%) |
|---|---|---|---|---|---|---|---|---|---|
| | E01-12-C | 35 | 55 | 65 | 93 | 1000 | 87 | 594.4 | 100.2 |
| | E01-13-B | 35 | 55 | 45 | 97 | 1000 | 158 | 622.5 | 104.9 |
| | E01-13-C | 35 | 55 | 85 | 97 | 400 | 38 | 632.1 | 106.5 |
| | E01-13-D | 35 | 55 | 85 | 97 | 1000 | 124 | 614.9 | 103.6 |
| | E01-14-A | 15 | 55 | 65 | 97 | 400 | | 597.1 | 100.6 |
| | E01-14-C | 45 | 55 | 65 | 97 | 400 | | 630.1 | 106.2 |
| | E01-14-D | 45 | 55 | 65 | 97 | 1000 | | 635.8 | 107.1 |
| Ag | E99-50-C | 35 | 55 | 65 | 97 | 1000 | 1364 | 600.1 | 101.1 |
| B | E99-57-B | 35 | 55 | 35 | 97 | 600 | 27 | 605.2 | 102.0 |
| | E99-58-B | 35 | 55 | 40 | 97 | 1000 | 30 | 595.5 | 100.3 |
| | E00-32-A | 35 | 55 | 30 | 97 | 1000 | 76 | 596.0 | 100.4 |
| | E00-32-B | 35 | 55 | 50 | 97 | 1000 | 59 | 618.8 | 104.3 |
| | E00-32-C | 35 | 55 | 65 | 97 | 1000 | 59 | 607.6 | 102.4 |
| | E00-58-B | 35 | 55 | 65 | 97 | 200 | 13 | 596.4 | 100.5 |
| Al | E99-59-A | 35 | 55 | 30 | 97 | 1000 | 335 | 611.7 | 103.1 |
| | E00-21-D | 35 | 55 | 30 | 97 | 1000 | 2600 | 600.2 | 101.1 |
| Zn | E01-15-A | 35 | 55 | 65 | 93 | 400 | | 608.3 | 102.5 |
| | E01-15-B | 35 | 55 | 65 | 93 | 1000 | | 606.8 | 102.2 |
| | E01-15-D | 35 | 55 | 65 | 99 | 1000 | | 598.8 | 100.9 |
| | E01-16-A | 35 | 55 | 45 | 97 | 400 | | 600.2 | 101.1 |
| | E01-16-C | 35 | 55 | 85 | 97 | 400 | | 604.4 | 101.8 |
| | E01-16-D | 35 | 55 | 85 | 97 | 1000 | | 624.6 | 105.2 |
| In | E00-05-C | 35 | 55 | 35 | 97 | 1000 | 858 | 601.6 | 101.4 |
| XRD Performance to a −0.2 V Cutoff | | | | | | | | | |
| Ni | E99-59-D | 35 | 55 | 30 | 97 | 1000 | 62 | 809.0 | 100.1 |
| | E00-62-B | 35 | 55 | 65 | 97 | 700 | 72 | 816.1 | 101.0 |
| | E01-11 | 35 | 55 | 65 | 97 | 1000 | 104 | 824.8 | 102.0 |
| | E01-13-A | 35 | 55 | 45 | 97 | 400 | 44 | 808.6 | 100.0 |
| | E01-13-B | 35 | 55 | 45 | 97 | 1000 | 158 | 808.8 | 100.1 |
| | E01-13-C | 35 | 55 | 85 | 97 | 400 | 38 | 823.3 | 101.9 |
| | E01-14-A | 15 | 55 | 65 | 97 | 400 | | 809.5 | 100.1 |
| | E01-14-C | 45 | 55 | 65 | 97 | 400 | | 810.2 | 100.2 |
| | E01-14-D | 45 | 55 | 65 | 97 | 1000 | | 814.7 | 100.8 |
| B | E99-57-B | 35 | 55 | 35 | 97 | 600 | 27 | 836.6 | 103.5 |
| | E99-58-B | 35 | 55 | 40 | 97 | 1000 | 30 | 821.2 | 101.6 |
| | E00-17-D | 35 | 55 | 40 | 97 | 1000 | 41 | 817.6 | 101.2 |
| | E00-32-A | 35 | 55 | 30 | 97 | 1000 | 76 | 816.2 | 101.0 |
| | E00-32-B | 35 | 55 | 50 | 97 | 1000 | 59 | 816.3 | 101.0 |
| | E00-32-C | 35 | 55 | 65 | 97 | 1000 | 59 | 808.5 | 100.0 |
| Al | E99-59-A | 35 | 55 | 30 | 97 | 1000 | 335 | 820.0 | 101.4 |
| Ce | E00-17-A | 35 | 55 | 30 | 97 | 250 | 1557 | 819.8 | 101.4 |
| Zn | E01-16-A | 35 | 55 | 45 | 97 | 400 | | 813.3 | 100.6 |
| | E01-16-D | 35 | 55 | 85 | 97 | 1000 | | 817.3 | 101.1 |
| Au | E00-01-C | 35 | 55 | 30 | 97 | 1000 | 1 | 822.9 | 101.8 |
| Cu | E00-02-B | 35 | 55 | 30 | 97 | 1000 | 19 | 829.4 | 102.6 |
| In | E00-05-C | 35 | 55 | 35 | 97 | 1000 | 858 | 816.0 | 101.0 |
| XRD Performance to a −0.3 V Cutoff | | | | | | | | | |
| Ni | E99-59-D | 35 | 55 | 30 | 97 | 1000 | 62 | 890.5 | 100.8 |
| | E00-21-B | 35 | 55 | 30 | 97 | 1000 | 79 | 885.9 | 100.2 |
| | E00-62-A | 35 | 55 | 65 | 97 | 600 | 2 | 887.2 | 100.4 |
| | E00-62-B | 35 | 55 | 65 | 97 | 700 | 72 | 895.6 | 101.3 |
| | E01-11 | 35 | 55 | 65 | 97 | 1000 | 104 | 897.1 | 101.5 |
| | E01-13-A | 35 | 55 | 45 | 97 | 400 | 44 | 886.0 | 100.2 |
| | E01-13-C | 35 | 55 | 85 | 97 | 400 | 38 | 895.2 | 101.3 |
| | E01-14-D | 45 | 55 | 65 | 97 | 1000 | | 885.3 | 100.2 |
| B | E99-57-B | 35 | 55 | 35 | 97 | 600 | 27 | 907.8 | 102.7 |
| | E99-58-B | 35 | 55 | 40 | 97 | 1000 | 30 | 894.6 | 101.2 |
| | E00-17-D | 35 | 55 | 40 | 97 | 1000 | 41 | 899.9 | 101.8 |
| | E00-32-A | 35 | 55 | 30 | 97 | 1000 | 76 | 894.3 | 101.2 |
| | E00-32-B | 35 | 55 | 50 | 97 | 1000 | 59 | 887.7 | 100.4 |
| Al | E99-59-A | 35 | 55 | 30 | 97 | 1000 | 335 | 893.7 | 101.1 |
| Ce | E00-17-A | 35 | 55 | 30 | 97 | 250 | 1557 | 900.7 | 101.9 |
| Zn | E00-01-B | 35 | 55 | 40 | 97 | 1000 | 192 | 888.2 | 100.5 |
| | E01-16-A | 35 | 55 | 45 | 97 | 400 | | 887.3 | 100.4 |
| | E01-16-D | 35 | 55 | 85 | 97 | 1000 | | 886.2 | 100.3 |
| Au | E00-01-C | 35 | 55 | 30 | 97 | 1000 | 1 | 903.8 | 102.3 |
| Cu | E00-02-B | 35 | 55 | 30 | 97 | 1000 | 19 | 907.7 | 102.7 |
| In | E00-05-C | 35 | 55 | 35 | 97 | 1000 | 858 | 897.0 | 101.5 |

TABLE 13-continued

XMD Performance at Different Voltage Cutoff Values

| | | | | | | Dopant | | Performance | |
|---|---|---|---|---|---|---|---|---|---|
| | | $H_2SO_4$ | $Mn^{2+}$ | I | T | Bath | Solid | | |
| Dopant | Sample | $(gL^{-1})$ | $(gL^{-1})$ | $(Am^{-2})$ | (°C.) | (ppm) | (ppm) | $(Cg^{-1})$ | (%) |
| XRD Performance to a −0.4 V Cutoff | | | | | | | | | |
| Ti | E98-11-A | 35 | 55 | 65 | 97 | 1000 | 5900 | 960.6 | 100.3 |
| Ni | E00-21-B | 35 | 55 | 30 | 97 | 1000 | 79 | 958.8 | 100.1 |
| | E00-62-B | 35 | 55 | 65 | 97 | 700 | 72 | 960.7 | 100.3 |
| | E01-11 | 35 | 55 | 65 | 97 | 1000 | 104 | 970.3 | 101.3 |
| | E01-13-B | 35 | 55 | 45 | 97 | 1000 | 158 | 984.5 | 102.8 |
| | E01-13-C | 35 | 55 | 85 | 97 | 400 | 38 | 966.7 | 100.9 |
| Fe | E99-49-B | 35 | 55 | 65 | 97 | 250 | 3700 | 978.4 | 102.2 |
| Cr | E99-52-C | 35 | 55 | 65 | 97 | 1000 | 2015 | 957.7 | 100.0 |
| B | E00-17-D | 35 | 55 | 40 | 97 | 1000 | 41 | 977.1 | 102.0 |
| | E00-32-A | 35 | 55 | 30 | 97 | 1000 | 76 | 960.8 | 100.3 |
| | E00-32-B | 35 | 55 | 50 | 97 | 1000 | 59 | 971.5 | 101.4 |
| | E00-32-C | 35 | 55 | 65 | 97 | 1000 | 59 | 970.2 | 101.3 |
| Al | E00-21-D | 35 | 55 | 30 | 97 | 1000 | 2600 | 960.3 | 100.3 |
| Ce | E00-17-A | 35 | 55 | 30 | 97 | 250 | 1557 | 966.8 | 101.0 |
| Zn | E00-17-C | 35 | 55 | 40 | 97 | 1000 | 245 | 958.2 | 100.1 |
| | E01-16-C | 35 | 55 | 85 | 97 | 400 | | 957.9 | 100.0 |
| Au | E00-01-C | 35 | 55 | 30 | 97 | 1000 | 1 | 959.1 | 100.1 |
| Cu | E00-02-B | 35 | 55 | 30 | 97 | 1000 | 19 | 969.3 | 101.2 |
| In | E00-05-C | 35 | 55 | 35 | 97 | 1000 | 858 | 962.5 | 100.5 |
| Hf | E00-21-A | 35 | 55 | 60 | 97 | 50 | 951 | 968.9 | 101.2 |
| XRD Performance to a −0.5 V Cutoff | | | | | | | | | |
| Ti | E98-11-B | 35 | 55 | 65 | 97 | 2500 | | 1161.3 | 106.5 |
| | E98-11-C | 35 | 55 | 65 | 97 | 5000 | | 1162.9 | 106.6 |
| | E98-11-D | 35 | 55 | 65 | 97 | 10000 | | 1158.0 | 106.2 |
| Li | E99-06-B | 35 | 55 | 65 | 97 | 250 | 78 | 1092.8 | 100.2 |
| Mg | E99-35-C | 35 | 55 | 65 | 97 | 1000 | | 1098.9 | 100.7 |
| Ni | E99-59-D | 35 | 55 | 30 | 97 | 1000 | 62 | 1179.2 | 108.1 |
| | E00-21-B | 35 | 55 | 30 | 97 | 1000 | 79 | 1117.7 | 102.5 |
| | E00-57-A | 35 | 55 | 65 | 97 | 100 | 10 | 1104.9 | 101.3 |
| | E00-57-B | 35 | 55 | 65 | 97 | 200 | 17 | 1120.9 | 102.8 |
| | E00-62-A | 35 | 55 | 65 | 97 | 600 | 2 | 1161.0 | 106.4 |
| | E00-62-B | 35 | 55 | 65 | 97 | 700 | 72 | 1188.1 | 108.9 |
| | E01-13-A | 35 | 55 | 45 | 97 | 400 | 44 | 1147.5 | 105.2 |
| | E01-12-C | 35 | 55 | 65 | 93 | 1000 | 87 | 1137.2 | 104.2 |
| | E01-13-C | 35 | 55 | 85 | 97 | 400 | 38 | 1108.5 | 101.6 |
| | E01-14-A | 15 | 55 | 65 | 97 | 400 | | 1105.2 | 101.3 |
| | E01-14-B | 15 | 55 | 65 | 97 | 1000 | | 1092.8 | 100.2 |
| | E01-14-D | 45 | 55 | 65 | 97 | 1000 | | 1091.7 | 100.1 |
| Co | E99-48-B | 35 | 55 | 65 | 97 | 250 | 80 | 1110.2 | 101.8 |
| Fe | E99-49-C | 35 | 55 | 65 | 97 | 1000 | 16000 | 1115.3 | 102.2 |
| B | E99-58-B | 35 | 55 | 40 | 97 | 1000 | 30 | 1121.5 | 102.8 |
| | E00-17-D | 35 | 55 | 40 | 97 | 1000 | 41 | 1164.9 | 106.8 |
| | E00-32-A | 35 | 55 | 30 | 97 | 1000 | 76 | 1144.0 | 104.9 |
| | E00-32-B | 35 | 55 | 50 | 97 | 1000 | 59 | 1098.1 | 100.7 |
| | E00-32-C | 35 | 55 | 65 | 97 | 1000 | 59 | 1101.8 | 101.0 |
| | E00-58-A | 35 | 55 | 65 | 97 | 100 | 6 | 1139.5 | 104.5 |
| | E00-58-B | 35 | 55 | 65 | 97 | 200 | 13 | 1143.8 | 104.8 |
| | E00-58-C | 35 | 55 | 65 | 97 | 500 | 33 | 1185.0 | 108.6 |
| | E00-58-D | 35 | 55 | 65 | 97 | 1000 | 53 | 1140.8 | 104.6 |
| Ce | E00-01-A | 35 | 55 | 30 | 97 | 250 | 3100 | 1167.9 | 107.1 |
| | E00-17-A | 35 | 55 | 30 | 97 | 250 | 1557 | 1197.7 | 109.8 |
| Zn | E00-01-B | 35 | 55 | 40 | 97 | 1000 | 192 | 1148.1 | 105.2 |
| | E00-17-C | 35 | 55 | 40 | 97 | 1000 | 245 | 1175.5 | 107.8 |
| | E01-15-C | 35 | 55 | 65 | 99 | 400 | | 1092.8 | 100.2 |
| | E01-16-A | 35 | 55 | 45 | 97 | 400 | | 1161.4 | 106.5 |
| | E01-16-B | 35 | 55 | 45 | 97 | 1000 | | 1151.1 | 105.5 |
| | E01-16-C | 35 | 55 | 85 | 97 | 400 | | 1131.7 | 103.7 |
| | E01-16-D | 35 | 55 | 85 | 97 | 1000 | | 1106.6 | 101.4 |
| Au | E00-01-C | 35 | 55 | 30 | 97 | 1000 | 1 | 1191.6 | 109.2 |
| Pt | E00-01-D | 35 | 55 | 30 | 97 | 1000 | 29 | 1195.9 | 109.6 |
| Cu | E00-02-B | 35 | 55 | 30 | 97 | 1000 | 19 | 1129.8 | 103.6 |
| In | E00-05-C | 35 | 55 | 35 | 97 | 1000 | 858 | 1144.5 | 104.9 |
| Sr | E00-05-D | 35 | 55 | 40 | 97 | 1000 | 15000 | 1203.4 | 110.3 |
| Nb | E00-40-A | 35 | 55 | 30 | 97 | 100 | 626 | 1186.5 | 108.8 |
| Ge | E00-48-A | 35 | 55 | 30 | 97 | 100 | 1259 | 1142.3 | 104.7 |

Figure 12:
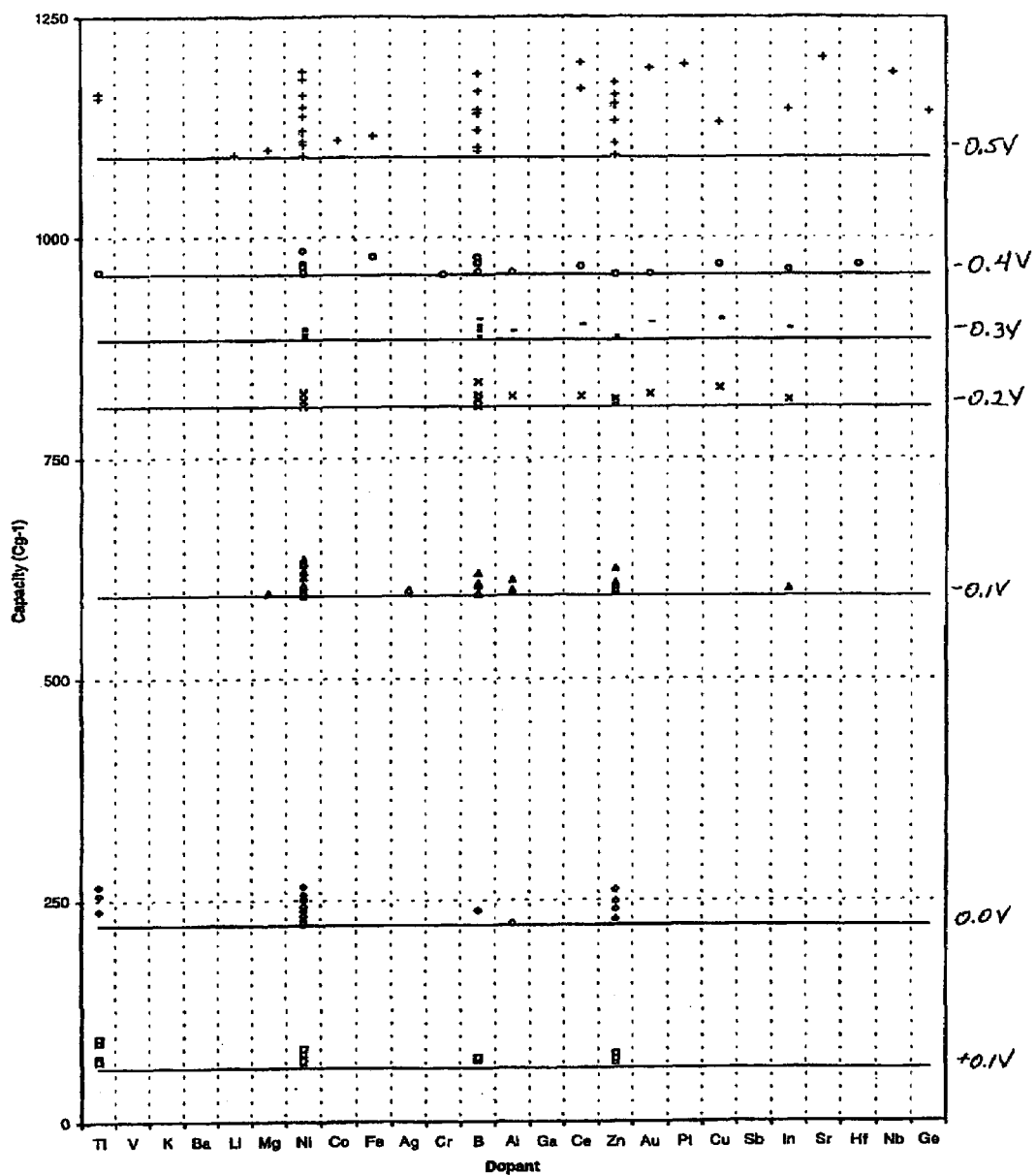
FIG. 12 shows a graph illustrating the performance of the XMD materials at the various voltage cutoffs relative a commercially available EMD (Kerr McGee EMD).

Table 13 shows the perfomance increases gained by the use of XMD material in the cathodes of alkaline batteries. These XMD materials were prepared using various conditions of manufacture, and contain various levels of dopant. Some XMD materials only showed improved performance at some levels of voltage cutoff. Others such as Ni, B and Zn showed improved performance at all levels of voltage cutoff. The significance of this is that some XRDs can be added to cathode mixes to improve the performance at certain levels of discharge. Optimal blends of XMDs and EMDs can be created to optimize the performance of the cathode for the desired application. FIG. 12 shows a graph illustrating the performance of the XMD materials at the various voltage cutoffs relative a commercially available EMD (Kerr McGee EMD).

Manganese Dioxide Characterization Methods

Dopant Level

Chemical analysis for the dopant species is achieved in two steps. The first step is to dissolve a known amount of the powdered manganese dioxide sample in either hydrochloric or nitric acid. Adding either of these acids to manganese dioxide will result in the reduction of solid manganese dioxide to soluble $Mn^{2+}$. With dissolution of the structure we also liberate the dopant ions into solution. The second step in the analysis procedure is to take the solution resulting from dissolution of the manganese dioxide and analyze it using either ICP-MS (inductively coupled plasma spectroscopy in conjunction with mass spectrometry) or ICP-AES (inductively coupled plasma spectroscopy in conjunction with atomic emission spectroscopy). ICP-MS can be used to analyze for very low dopant levels, while ICP-AES is used for higher dopant levels. The results are expressed in terms of parts per million; i.e., µg of dopant per g of manganese dioxide sample.

BET Surface Area

This property is measured by nitrogen gas adsorption at the temperature of liquid nitrogen. The technique essentially involves introducing a known amount of nitrogen into a vessel of known volume that contains the EMD sample. By measuring the nitrogen pressure in the vessel above the EMD sample, and knowing the amount of gas introduced and the volume of the vessel, we can calculate how much of the nitrogen has been adsorbed onto the EMD surface. If we then assume that the nitrogen adsorbs to form a monolayer on the XMD surface, we can then calculate XMD surface area using the size of a single nitrogen molecule.

The XMDs generally had increased surface areas relative to undoped EMDs. The increased surface area can improve performance in alkaline cathodes as surface area is usually an indicator of the ability of the material to absorb electrolyte. High absorbent XMDs have shown improved performance when the cathode is optimized to take advantage of this attribute. Again such high surface areas XMDs can be useful in blends of cathode material, and allow a cathode designer to engineer the desired absorbtivity into the cathode mix.

Real Density

The real density of the manganese dioxide samples were determined using a pycnometer.

Resistivity

The resistivity of each partially reduced XMD sample was measured using an apparatus consisting of two stainless steel pistons that fit snugly into a teflon-lined cylinder sample of the partially reduced XMD was placed in the cylinder between the two pistons. A constant pressure was exerted on the sample by compressing the cell in a hydraulic press (1000 kg). The resistance $R(\Omega)$ of the resulting pellet was then measured. Immediately after measuring the pellet resistance the pressure on the cell was relieved so that the pellet thickness could be measured (l; cm). The resistivity of the sample ($\rho$; $\Omega$ cm) was then determined using, $$R = \frac{\rho l}{A}$$

where A is the cross-sectional area of the cylinder ($cm^2$).

The results demonstrate that improved electrochemical characteristics can be achieved with the doped manganese dioxides of this invention. More specifically, these preliminary data indicate that the doped manganese dioxides can be used to fabricate electrochemical batteries that exhibit improved performance characteristics.

Thin Film Batteries

Example 5 describes method of making improved cathode materials. These cathode materials of the present invention can be used in thin film batteries. Such a thin film battery would comprise thin film electrodes separated by a separator, and immersed in an electrolyte. U.S. Pat. Nos. 4,007,472 and 4,621,035, the disclosures of which are incorporated by reference herein, describe additional embodiments of thin film batteries. The improvement to the referenced embodiments is the substitution of the cathode material of the present invention for the conventional depolarizing materials described in the references.

Making the thin film cathode could be implemented in various ways. The basic requirement is that a conductive substrate is immersed in or coated with a liquid or gelled electrolyte containing the solution from which the cathode is to be made. For example, if a zirconium manganese dioxide cathode material is desired, the solution would contain zirconium sulfate, manganese sulfate dissolved in sulfuric acid.

The desired shape of the cathode can be manufactured in a patterned type of system using lithography, printing techniques such as screen or stencil printing or using a mask. Masks can be thin, in which case the electrolyte lies on top of the mask or thick in which case the mask can contain the electrolyte. Alternatively, a gel polymer electrolyte could be used that is formed into the desired shape (punched, cut or sprayed, etc.) so that only those areas covered by the gel are actually plated with the cathode material. The substrate onto which the cathode material is plated can be a variety of materials, including those commonly used for producing EMD by electroplating e.g. carbon and titanium. Alternatively, a conductive plastic that is suitably stable to the cathode material could be used e.g. carbon impregnated vinyl film such as that sold under the tradename Condulon.

After plating, it is preferred to remove the plated electrode from solution/gel electrolyte or vice versa. Alternatively, one could keep the electrolyte in place as long as almost all of the Manganese and dopant had been plated out of solution. This would require that the electrolyte film be thin or else this would be a slow manufacturing process. The cathode material will usually require rinsing with water or electrolyte to remove any remaining traces of the plating solution, but this may not always be necessary depending on the chemistry of the battery being manufactured.

The cathode material can be used to make cells in a number of ways. The following examples are for $Zn-MnO_2$ cells but equivalent techniques could also be use for non-aqueous cells, such as those using lithium and/or carbon anodes. The cells can be secondary or primary cells. Non-aqueous cells use organic solvents, polymers or molten salts as electrolytes and usually require varying degrees of moisture control to prevent attack on the electrolyte and any lithium that is used. For example, one may want to make a Zn—MnO$_2$ cell using an aqueous solution of any of the following salts NH$_4$Cl, ZnCl$_2$, NH$_4$Cl mixed with ZnCl$_2$, KOH, NaOH, KOH mixed with NaOH. If no NaOH or KOH is used, one may also want to add ZnO to the electrolyte to help neutralize any remaining acidity in the cathode material from the plating bath. Such electrolytes are well known to the industry. One could make a thin battery using conventional separators used for Leclanche and alkaline cells, such as coated cellulose, papers, cellophane, etc. Microporous polyolefin separators could also be sued. However, a better way would probably to spray on a gel electrolyte of some type. For alkaline cells, the gel could be formed by addition of alkaline electrolyte to a dried film of a polyacrylate. The electrolyte would coagulate the polymer to form a gel electrolyte separator. For Leclanche and ZnCl$_2$ electrolytes, one could spray on a methyl cellulose or similar material as a separator and electrolyte.

These methods can be used in cells that use either coplanar or sandwich-type arrangement of anode and cathode. In the former case, the gel only has to keep the electrolyte in contact with anode and cathode. For sandwich-style cells, the gel electrolyte/separator combination should be strong enough to prevent cell shorting. Generally, the coplanar arrangement is preferred from a manufacturing viewpoint. However, the sandwich style cell may have better rate capability and would be preferred if this is important. In this example the anode for the cell is zinc can be in the form of either a powder or sheet/foil zinc. Sheet/foil zinc can be rolled to the desired thickness. This is usually not part of the battery assembly process. Powdered zinc is usually coated or printed onto a conductive substrate. It is known in the art to use carbon as a conductive material to act as the current collector. However, other current collectors can be used and they can be either powders or foils (e.g., a tin foil). One can also use a zinc foil as a substrate. The advantage of using zinc foil as a substrate is that it typically gasses less than powdered zinc (due to its smaller particle size than is normally used in the industry). Coating finely divided zinc onto a zinc foil should give a high discharge rate (especially in alkaline cells) while overcoming the gassing that might be introduced with other materials. Zinc powder size may be 2-200 μm in average diameter. Many printing/coating techniques can be used to form the anode into the desired area, thickness and shape. Vacuum deposition methods could also be used. Alternatively, one can even electroplate the zinc as well.

The separator/gel electrolyte described above can also be applied to the anode instead of the cathode or even to both. Applying the gel electrolyte to both anode and cathode can help maintain cell electrode alignment and stack pressure if the assembly can be laminated together. This is often done with gel-polymer lithium-ion cells.

Additional electrolyte may need to be added to replace any lost during the previous assembly steps. The final stage is to close the cell and there are many ways to accomplish this. One way would be to have both anode and cathode printed/placed onto a plastic-coated metal laminate (usually aluminum) that can then be heat-sealed around the periphery to contain the electrolyte. Alternatively, the cell can be sealed by gluing or welding. Such techniques are known in the art. Alternatively, one of the battery surfaces could be the actual device itself. Another alternative would be to make a sheet of zinc the outer surface of the anode side of the cell.

Cells can be made in such a manner as single cells or as a bipolar stack. The latter uses conductive layers or cell interconnects coated on opposite sides with anode and cathode.

It will be understood by those who practice the invention and by those skilled in the art the various modifications and improvements may be made to the invention without departing from the spirit of the disclosed concept. The scope of protection afforded is to be determined by the claims and by the breath of interpretation allowed by law, including the doctrine of equivalents.

The invention claimed is:

1. A cathode of an alkaline battery, comprising a composition of electrolytic manganese dioxide and a doped manganese oxide corresponding to the formula Mn$_{1-x}$X$_w$O$_y$ in which w is about 0.000023 to 0.0144, and y ranges from about 1.90 to 2.00, X is at least one dopant selected from the group consisting of: B, Mg, Al, Si, P, Sc, Ti, V, Cr, Fe, Co, Ni, Cu, Zn, Ga, Ge, Sr, Y, Zr, Nb, Ru, Rh, Pd, Ag, In, Sn, Sb, Ba, Ce, Hf, Ta, Re, Os, Ir, Pt, Au and Bi, and in which the manganese, oxygen and the dopant are intermingled atomically, and wherein x is about 0.0046 to 0.0087.

2. The cathode of claim 1 further comprising a conductive material and wherein a combined weight of the conductive material, the electrolytic manganese dioxide and the doped manganese oxide is at least ninety weight percent of the cathode on a dry basis.

3. An alkaline battery, comprising the cathode of claim 1 and an anode comprising zinc.

4. An alkaline battery, comprising the cathode of claim 1 and an electrolyte comprising potassium hydroxide.

* * * * *